(12) United States Patent
Ravon et al.

(10) Patent No.: US 10,369,549 B2
(45) Date of Patent: *Aug. 6, 2019

(54) USE OF NICKEL-MANGANESE OLIVINE AND NICKEL-MANGANESE SPINEL AS BULK METAL CATALYSTS FOR CARBON DIOXIDE REFORMING OF METHANE

(71) Applicant: SABIC Global Technologies B.V., Bergen op Zoom (NL)

(72) Inventors: Ugo Ravon, Thuwal (SA); Lawrence D'Souza, Thuwal (SA); Vinu Viswanath, Thuwal (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 7 days.

This patent is subject to a terminal disclaimer.

(21) Appl. No.: 15/557,156

(22) PCT Filed: Jan. 27, 2016

(86) PCT No.: PCT/IB2016/050409
§ 371 (c)(1),
(2) Date: Sep. 11, 2017

(87) PCT Pub. No.: WO2016/151411
PCT Pub. Date: Sep. 29, 2016

(65) Prior Publication Data
US 2018/0043340 A1    Feb. 15, 2018

Related U.S. Application Data

(60) Provisional application No. 62/135,821, filed on Mar. 20, 2015.

(51) Int. Cl.
| | |
|---|---|
| *B01J 23/889* | (2006.01) |
| *C01B 3/40* | (2006.01) |
| *B01J 37/08* | (2006.01) |
| *B01J 37/00* | (2006.01) |
| *B01J 23/00* | (2006.01) |
| *B01J 23/89* | (2006.01) |
| *B01J 37/04* | (2006.01) |
| *B01J 35/00* | (2006.01) |

(52) U.S. Cl.
CPC ......... *B01J 23/8892* (2013.01); *B01J 23/005* (2013.01); *B01J 23/892* (2013.01); *B01J 23/8986* (2013.01); *B01J 35/002* (2013.01); *B01J 37/0036* (2013.01); *B01J 37/04* (2013.01); *B01J 37/08* (2013.01); *C01B 3/40* (2013.01); *B01J 2523/00* (2013.01); *C01B 2203/0238* (2013.01); *C01B 2203/0244* (2013.01); *C01B 2203/107* (2013.01); *C01B 2203/1058* (2013.01); *C01B 2203/1064* (2013.01); *C01B 2203/1241* (2013.01); *Y02E 60/324* (2013.01); *Y02P 20/52* (2015.11)

(58) Field of Classification Search
CPC .................................................. B01J 23/8892
USPC ......................................................... 252/373
See application file for complete search history.

(56) References Cited

U.S. PATENT DOCUMENTS

| | | | |
|---|---|---|---|
| 3,368,982 | A | 2/1968 | Milbourne |
| 3,436,358 | A | 4/1969 | Thygesen |
| 4,456,703 | A | 6/1984 | Aldridge |
| 5,286,693 | A | 2/1994 | Ino et al. |
| 5,447,705 | A | 9/1995 | Petit et al. |
| 5,653,774 | A | 8/1997 | Bhattacharyya et al. |
| 5,985,178 | A | 11/1999 | Long et al. |
| 6,409,940 | B1 | 6/2002 | Gaffney et al. |
| 6,416,731 | B1 | 7/2002 | Dohrup et al. |
| 7,223,354 | B2 | 5/2007 | Ramani et al. |
| 7,449,424 | B2 | 11/2008 | Felix et al. |
| 7,528,092 | B2 | 5/2009 | Berben et al. |
| 7,645,440 | B2 | 1/2010 | Lomax, Jr. et al. |
| 7,772,450 | B2 | 8/2010 | Iaccino et al. |
| 7,915,196 | B2 | 3/2011 | Parent et al. |
| 7,985,710 | B2 | 7/2011 | Wang et al. |
| 8,137,655 | B2 | 3/2012 | Chornet et al. |
| 8,146,367 | B2 | 4/2012 | Trimm et al. |
| 8,207,083 | B2 | 6/2012 | Berben et al. |
| 8,241,523 | B2 | 8/2012 | Apanel et al. |
| 8,506,846 | B2 | 8/2013 | Yuan et al. |
| 8,575,063 | B2 | 11/2013 | Xu et al. |

(Continued)

FOREIGN PATENT DOCUMENTS

| | | |
|---|---|---|
| CN | 101045524 | 10/2007 |
| CN | 101186321 | 5/2008 |
| CN | 101332429 | 12/2008 |
| CN | 102010759 | 4/2011 |
| CN | 102416328 | 4/2012 |
| CN | 103484163 | 1/2014 |
| CN | 103599785 | 2/2014 |
| CN | 103657654 | 3/2014 |

(Continued)

OTHER PUBLICATIONS

Temperature programmed reduction studies of nickel manganite spinels. Laberty Christel et al. Thermochimica Acta, vol. 306, pp. 51-59 (Year: 1997).*

(Continued)

*Primary Examiner* — Douglas B Call
(74) *Attorney, Agent, or Firm* — Norton Rose Fulbright US LLP

(57) ABSTRACT

Disclosed are bulk metal oxide catalysts, and methods for their use, that include at 5 least two or more metals or two or more compounds thereof ($M^1$, $M^2$) and having an olivine crystal phase or a spinel crystal phase, or both phases, wherein the bulk metal oxide catalyst is capable of producing the $H_2$ and CO from the $CH_4$ and the $CO_2$ under substantially dry conditions.

17 Claims, 9 Drawing Sheets

(56) References Cited

U.S. PATENT DOCUMENTS

| | | | |
|---|---|---|---|
| 8,834,834 B2 | 9/2014 | Paquet et al. | |
| 2009/0011925 A1* | 1/2009 | Felix | B01J 23/04 502/60 |
| 2009/0314993 A1 | 12/2009 | Zhang et al. | |
| 2012/0079768 A1 | 4/2012 | Kiennemann et al. | |
| 2012/0273728 A1 | 11/2012 | Abatzoglou et al. | |
| 2013/0116116 A1 | 5/2013 | Schwab et al. | |
| 2014/0097387 A1 | 4/2014 | Biausque et al. | |

FOREIGN PATENT DOCUMENTS

| | | |
|---|---|---|
| CN | 103773425 | 5/2014 |
| CN | 103773449 | 5/2014 |
| GB | 1283780 | 8/1972 |
| WO | WO 2016/011240 | 1/1916 |
| WO | WO 2001/089687 | 11/2001 |
| WO | WO 2014/014818 | 1/2014 |
| WO | WO 2014/082996 | 6/2014 |

OTHER PUBLICATIONS

Olivine Group Mindat.org pp. 1-79 (Year: 2018).*
Chen et al., "$CO_2$ reforming of toluene as model compound of biomass tar on Ni/Palygorskite," Queensland University and Technology, (2013).
Choudhary et al., "Energy efficient conversion of methane to syngas over NiO—MgO solid solution," *Applied Energy*, 66(2):161-175, (2000).
Choudhary et al., "Oxidative Conversion of Methane to Syngas over Nickel Supported on Commercial Low Surface Area Porous Catalyst Carriers Precoated with Earth Oxides," *Journal of Catalysis*, 172(2):281-293, (1997).
Corella et al., "Biomass gasification with air in fluidized bed: reforming of the gas composition with commercial steam reforming catalysts," *Ind Eng Chem Res*, 37:4617-4624, (1998).
Courson et al., "Development of Ni catalysts for gas production from biomass gasification. Reactivity in steam-and dry-reforming." *Catal Today*, 63:427-437, (2000).
Courson et al., "Grafted NiO on natural olivine for dry reforming of methane," *Science and Technology of Advanced Materials*, 3(3):271-282, (2002).
Courson et al., "Hydrogen production from biomass gasification on nickel catalysts: Tests for dry reforming of methane," *Catalysis Today*, 76(1):75-86, (2002).
Cui et al., "Kinetic Depressing the Deposition of Carbon Species on Ni-Based Catalysts: $La_2O_3$ Adjusts the Reaction Rates of CO2 Higher than $CH_4$ by Tuning the Ea and Pre-exponential Factor," Natural gas Conversion VIII: proceedings of the $8^{th}$ natural gas conversion symposium, *Studies in surface science and catalysis*, 167:281, (2007).
da Silva Neto "Preparation of $Ni/SiO_2$, $Ni/SiO_2$—CaO and $Ni/SiO_2$—MgO catalysts of methane steam reforming," Natural gas conversion VIII: Proceedings of the $8^{th}$ natural gas conversion symposium, *Studies in surface science and catalysis*, 167:475, (2007).
Dayton, D., "A review of the Literature on Catalytic Biomass Tar Destruction," National Renewable Energy Laboratory, (2002).
Devi et al., "Olivine as tar removal catalyst for biomass gasifiers: Catalyst Characterization," *Applied Catalysis A: General*, 294(1):68-79, (2005).
Garcia et al., "Hydrogen Production by Steam Gasification of Biomass Using Ni—Al Coprecipitated Catalysts Promoted with Magnesium," *Energy Fuels*, 16(5):1222-1230, (2002).
Gerber, M.A. "Review of Novel Catalysts for Biomass Tar Cracking and Methane Reforming," Pacific Northwest National Laboratory; Prepared for the U.S. Department of Energy, 2007.
Guo et al., "Dry reforming of methane over nickel catalysts supported on magnesium aluminate spinels," *Applied Catalysis A: General*, 273(1-2): 75-82, (2004).

Hu et al., "Binary MgO-Based Solid Solution Catalysts for Methane Conversion to Syngas," *Catalysis Reviews: Science and Engineering*, 44(3):423-453, (2002).
International Preliminary Report on Patentability issued in International Application No. PCT/IB2016/050409, dated Jul. 13, 2017.
International Search Report and Written Opinion issued in International Application No. PCT/IB2016/050409, dated Aug. 3, 2016.
Kuhn et al, "Olivine catalysts for methane- and tar-steam reforming," *Applied Catalysis B:Environmental*, 81(1-2):14-26, (2008).
Kuhn et al., "Ni-olivine catalysts prepared by thermal impregnation: Structure, steam reforming activity, and stability," *Applied Catalysis A: General*, 341(1-2):43-49, (2008).
Lamber et al., "Dispersion changes of platinum supported on silica glass during thermal treatment in oxygen and hydrogen atmospheres," *Journal of Catalysis*, 105(1):213-226, (1987).
Littlewood et al., "Low Temperature Dry Reforming of Methane Catalysts vorgelegt von," 2015, retrieved from the internet URL: https://depositonce.tu-berlin.de/bitstream/11303/5323/3/littlewood_patrick.pdf.
Littlewood et al., "$Ni_{0.5}Mn_{0.95}O$ Catalysts for the dry reforming of methane," *Catalysis Today*, 242:111-118, (2014).
Long et al., "Sulfur Tolerant Magnesium Nickel Silicate Catalyst for Reforming of Biomass Gasification Products to Syngas," *Catalysts*, 2:264-280, (2012).
Lumpkin et al., "Composition, order-disorder and lattice parameters of olivines; relationships in silicate, germinate, beryllate, phosphate and borate olivines," *American Mineralogist*, 68:164-176, (1983).
Martin et al., "Benzene hydrogenation over nickel catalysts at low and high temperatures: Structure-sensitivity and copper alloying effects," *Journal of Catalysis*, 75(2):233-242, (1982).
Mo et al., "A highly dispersed and anti-coking Ni—La2O3/SiO2 catalyst for syngas production from dry carbon dioxide reforming of methane," *Catalysis Science and Technology*, 4:2107-2114, (2014).
Newnham, J "Optimisation and Characterisation of Nickel based nano-catalysts for the dry reforming of methane with carbon dioxide," Doctor of Philosphy (PhD), Applied Sciences, RMIT University, (2012).
Ocsachoque et al., "Effect of Rh addition on activity and stability over $Ni/\gamma-Al2o_3$ catalysts during methane reforming with $CO_2$," *Studies in Surface Science and Catalysis*, 397-402, (2007).
Sadykov et al., "Performance of monolithic catalysts with complex active component in partial oxidation of methane into syngas: experimental studies and modeling," Natural gas conversion VIII: proceedings of the $8^{th}$ Natural gas conversion symposium; *Studies in surface science and catalysis*, 167:361, (2007).
Swierczynski et al., "Steam reforming of tar from a biomass gasification process over Ni/olivine catalyst using toluene as a model compound," *Applied Catalysis B: Environmental*, 74(3-4):211-222, (2007).
Virginie et al., "Effect of Fe-olivine on the tar content during biomass gasification in a dual fluidized bed," *Applied Catalysis B: Environmental*, 121-122:214-222, (2012).
Wang et al., "$CO_2$ reforming of methane to syngas over Ni/SBA-15FeCrAl Catalyst," Natural gas conversion VII: Proceedings of the $8^{th}$ natural gas conversion symposium, *Studies in surface science and catalysis*, 167:367, (2007).
Wang et al., "Effect of chemical treatment on Ni/fly-ash catalysts in methane reforming with carbon dioxide, $8^{th}$ Natural gas conversion symposium," *Stud. Surf. Sci. Catal*, 167:275-280, (2007).
Wang et al., "Effects of promoters on catalytic activity and carbon deposition of $Ni/-Al_2O_3$ catalysts in $CO_2$-reforming of $CH_4$," *J. Chem. Technol. Biotechnol.*, 75:589-595, (2000).
West et al., "Solid State Chemistry and its Applications," *John Wiley and Sons Ltd.* 1990.
Xie et al., "One-Pot synthesis of Supported, Nanocrystalline Nickel Manganese Oxide for Dry Reforming of Methane," *ACS Catalysis*, 3(2):224-229, (2013).
Xu et al., "Characterization and Analysis of Carbon Deposited during the Dry Reforming of Methane over $Ni/La_2O_3/Al_2O_3$ Catalysts," *Chinese Journal of Catalysis*, 30(11): 1076-1084, (2009).
Zhang et al., "Steam reforming of tar compounds over Ni/olivine catalysts doped with $CeO_2$," *energy Conversion and Management*, 48:68-77, (2007).

(56) References Cited

OTHER PUBLICATIONS

Zhao et al., "Characterization of olvine-supported nickel silicate as potential catalysts for tar removal from biomass gasification," *Applied Catalysis A: General*, 489:42-50, (2015).

Zhao et al., "Thermally Impregnated Ni-Olivine Catalysts for Tar Removal by Steam Reforming in Biomass Gasifiers," *Ind. Eng. Chem. Res.*, 47(3):717-723, (2008).

\* cited by examiner where M1 and M2 are metal cations.

USE OF NICKEL-MANGANESE OLIVINE AND NICKEL-MANGANESE SPINEL AS BULK METAL CATALYSTS FOR CARBON DIOXIDE REFORMING OF METHANE

CROSS REFERENCE TO RELATED APPLICATIONS

The application is a national phase application under 35 U.S.C. § 371 of International Application No. PCT/IB2016/050409 filed Jan. 27, 2016, which claims benefit to U.S. Provisional Patent Application Ser. No. 62/135,821 titled "USE OF NICKEL-MANGANESE OLIVINE AND NICKEL-MANGANESE SPINEL AS BULK METAL CATALYSTS FOR CARBON DIOXIDE REFORMING OF METHANE" to Rayon et al., filed Mar. 20, 2015. The entire contents of each of the above-referenced applications are incorporated herein without disclaimer.

BACKGROUND OF THE INVENTION

A. Field of the Invention

The invention generally concerns the use of nickel-manganese bulk metal oxide catalysts capable of producing hydrogen ($H_2$) and carbon monoxide from methane ($CH_4$) and carbon dioxide ($CO_2$). In particular, the bulk metal oxide catalyst includes a nickel-manganese olivine phase.

B. Description of Related Art

Synthesis gas or "syngas" is a gas mixture that includes carbon monoxide and hydrogen. Syngas is typically used as an intermediary gas to produce a wide range of various products, such as mixed alcohols, hydrogen, ammonia, i-$C_4$ hydrocarbons, mixed alcohols, Fischer-Tropsch products (e.g., waxes, diesel fuels, olefins, gasoline, etc.) methanol, ethanol, aldehydes, alcohols, dimethoxy ethane, methyl tert-butyl ether, acetic acid, gas-to-liquids, butryaldehyde, etc. Syngas can also be used as a direct fuel source, such as for internal combustible engines.

One of the more common methods of producing syngas is by oxidizing hydrocarbon gases such as methane. For instance, the controlled oxidation of methane can be carried out using carbon dioxide, water, oxygen, or a combination of such materials. For industrial scale applications, methane can be reformed into syngas by using steam, as shown in the following reaction:

$$CH_4 + H_2O \rightarrow CO + 3H_2 \quad (I)$$

The ratio of CO/$H_2$ obtained in steam reforming process is about 0.33. Many applications, however, require a CO/$H_2$ of about 1.0. Such applications include production of aldehydes, alcohols, acetic anhydride, acetic acid, ethers, and ammonia. Therefore, the current solution is to remove excess $H_2$ from the produced syngas using separation techniques, which can decrease efficient production while simultaneously increasing associated costs. The ratio of CO/$H_2$ may be increased to about 1.0 by dry reforming of methane. In dry reforming of methane, methane is reacted with carbon dioxide or a mixture of carbon dioxide and oxygen as shown in the following equations:

$$CH_4 + CO_2 \rightarrow 2CO + 2H_2 \quad (II)$$

$$CH_4 + CO_2 + 1/2 O_2 \rightarrow 2CO + 3H_2 + H_2O \quad (III)$$

Catalysts are used to increase the rate of the reaction for both of the above reforming reactions. One problem associated with dry reforming (using carbon dioxide) of methane is that current catalysts are prone to sintering, which reduces the active surface of the catalyst. Another problem is supported catalysts that have good stability in retaining their structure and size over few hundred hours, eventually with time start growing in size. Thus, in dry reforming applications, as the particle size of the catalyst increases over time, the propensity to form agglomerations (e.g., coke) in the catalyst pore structure also increases.

SUMMARY OF THE INVENTION

Solutions to the sintering and coking problems encountered during dry reforming of methane have been discovered. Dry reforming of methane is also known as carbon dioxide reforming of methane. This process is performed in the absence of or a minimal amount of water or steam. At least one solution resides in the use of a bulk metal oxide catalyst capable of producing hydrogen ($H_2$) and carbon monoxide (CO) from a reactant gas stream composed of methane ($CH_4$) and carbon dioxide ($CO_2$) under substantially dry reforming conditions (i.e., in the absence of steam) to reduce sintering and coking of the catalytic materials at elevated temperatures. The reactant gas stream has substantially no water, or 0.1 wt. % or less of water. In one particular embodiment, the bulk metal oxide catalyst includes a mixture of nickel (Ni), and manganese (Mn). Further, the bulk metal oxide catalyst is synthesized under conditions sufficient to produce a catalyst having a nickel-manganese-silica olivine crystal structure, a nickel-manganese oxide spinel crystal structure, or a mixture of both structures.

In a particular aspect of the present invention, there is disclosed a bulk metal catalyst metal oxide that includes at least two or more metals or two or more compounds thereof ($M^1$, $M^2$) and having an olivine crystal phase or a spinel crystal phase, or both phases. In some aspects of the invention $M^1$ is nickel or a compound thereof, and $M^2$ is manganese or a compound thereof. In certain aspects, the bulk metal oxide is effective at elevated temperatures (e.g., greater than 700° C. or 800° C. or at a temperature range of greater than 700° C. to 950° C., or 750° C. to 800° C.) at a gas hourly space velocity (GHSV) ranging from 500 to 1000,000 $h^{-1}$ (e.g., at a temperature of 800° C. at a GHSV of 75,000 $h^-$) as a catalyst for syngas production or methane reformation reactions. At these temperatures the bulk metal oxide catalyst exhibits enhanced activity, coke resistance properties and sinter resistance properties. The bulk metal oxide catalyst is resistant to coke and/or at least one of the metals in the catalyst is inhibited from sintering of the bulk metal oxide catalyst upon heating. The bulk metal oxide catalyst can have a substantially olivine phase, a substantially spinel phase, a mixture of olivine and spinel phases, and/or is valence neutral. The phases (structure) of the bulk metal oxide catalysts can be determined by X-ray diffraction (XRD) methods. The bulk metal oxide of the invention can have: (1) an olivine crystal phase represented by the formula $(M^1_x M^2_{1-x})_2 SiO_4$ where $0 < x \leq 0.25$ or preferably $(Ni_x Mn_{1-x})_2 SiO_4$ where $0 < x \leq 0.25$ or $0.1 \leq x \leq 0.25$; (2) a spinel crystal phase represented by the formula: $M^1_x M^2_{3-x} O_4$, where x is $0 < x \leq 1$ or preferably $Ni_x Mn_{3-x} O_4$, where x is $0 < x \leq 1$ or $0.01 \leq x \leq 1$; or (3) have both of the aforementioned phases. In some aspects, the bulk metal catalyst can also include a substantially inert crystal phase represented by $M^2 SiO_3$ or $Mn_2 SiO_3$. The molar ratio of $M^1$ to $M^2$ in the olivine crystal phase can be ≤9, 1 to 9, 2 to 8, or preferably 3 to 9, or any range there between (e.g., 1, 2, 3, 4, 5, 6, 7, 8, 9, or any value there between). In the spinel phase, the molar ratio of $M^1$ to $M^2$ is 3<50 (e.g., 4, 5, 6, 7, 8, 9, 10, 11, 12, 13, 14, 15, 16, 17, 18, 19, 20, 25, 30, 35, 40, 45, 50 or any value there between). In a particular aspect, the bulk metal catalyst does not include a spinel crystal phase represented by the formula $M^1_xM^2_{3-x}O_4$, where x is 0<x≤1. In some aspects of the invention, the catalyst consists substantially of, or completely of, the aforementioned nickel-manganese olivine crystal phase. In one aspect of the invention, the bulk metal oxide does not include a nickel-manganese olivine crystal phase having a structure of $(Ni_xMn_{1-x})_2SiO_4$ where 0≤x≤0.25. In a preferred aspect of the invention, $M^1$ and $M^2$ can be incorporated into the crystal lattice structure of the catalyst of the present invention. In certain aspects of the invention, the bulk metal catalyst can include a third metal ($M^3$) and $M^1$, $M^2$ and $M^3$ are different. The bulk metal oxide catalyst can have a olivine crystal phase and be represented by the formula: $(M^1_x,M^2_{1-x-y},M^3_y)_2SiO_4$ where 0<x≤0.25, 0≤y≤0.05 and 0.01≤(x+y)≤0.25, and $M^1$, $M^2$, and $M^3$ are different, or a spinel crystal phase having the formula: $(M^1_x, M^2_{3-x-y}, M^3_y)O_4$ where 0.01≤x≤1, 0≤y≤0.05 and 0<(x+y)<1, and $M^1$, $M^2$, and $M^3$ are different, and $M^1$, $M^2$, and $M^3$ are different, or both. In such a catalyst, $M^1$ is preferably nickel and $M^2$ is preferably manganese. The olivine phase of the catalysts or the present invention described throughout the specification can have a crystal structure that has hexagonal close packed arrays of oxygen anions ($O^-$) in that one-half of the octahedral interstices are occupied by $M^1$, $M^2$, and/or $M^3$ cations ($M^{1+}$, $M^{2+}$, and/or $M^{3+}$) and one-eighth of the tetrahedral interstices are occupied by Si cations ($Si^+$). In some aspects of the invention, the bulk metal oxide catalyst includes $M^3$ can be a noble metal from Group VIII or a compound thereof or Group IB or a compound thereof. In particular, $M^3$ includes Pt, Ru, Rh, Ir, Ag, Au, Pd or compounds thereof. In certain aspects, the bulk metal oxide catalyst is a mixture of Ni or a compound thereof, Mn or a compound thereof, and $SiO_4$. In a particular aspect, the bulk metal is a mixture of Ni, noble metal, and Mn, where the noble metal can be Pt, Ru, Rh, Ir, Ag, Au, Pd, or any combination thereof. In a particular embodiment, the catalyst includes manganese, nickel and platinum. A non-limiting example of a NiMnPt catalyst is $(Ni_{0.5}Mn_{0.45}Pt_{0.05})_2SiO_4$. In another embodiment, the catalyst includes has a substantially olivine phase and includes manganese, nickel and ruthenium. Without wishing to be bound by theory, it is believe that the incorporation of nickel inhibits sintering of the bulk metal oxide upon heating. The bulk metal oxide catalyst of the present invention can be resistant to coke formation at 1 bar and 800° C. for at least up to 100 hours on the stream.

In certain aspects of the invention, a method of making a bulk metal oxide catalyst described herein includes (a) mixing $M^1$ oxide particles, $M^2$ oxide particles, and silicon dioxide ($SiO_2$) to form a mixture. The molar ratio of $M^2$ to Si can be 1:1 to 3:1, preferably 2:1 and the molar ratio of $M^1$:$M^2$ can be 0.01 to 0.5 and (b) calcining the mixture at a temperature of 1000° C. to 1500° C., preferably 1200° C. to 1300° C., for a sufficient period of time to obtain a bulk catalyst having a $M^1$-$M^2$ olivine crystal phase or a $M^1$-$M^2$ spinel crystal phase, or a combination thereof. The conditions in step (a) include grinding the mixture to a powder and forming the mixture into a pellet and then subjecting the pellet to the calcining conditions of step (b). Steps (a) and (b) can be repeated at least twice. The conditions of step (b) include calcining at a temperature of about 1100 to 1275° C. for about 22 to 48 hours and subsequently cooled to room temperature. The calcined pellet can be ground to a powdered form. In certain aspects, $M^1$, $M^2$ can be metal oxides. In a particular embodiment, $M^1$ is nickel oxide (NiO) and $M^2$ is manganese oxide (MnO). In some embodiments, $M^1$ oxide particles, $M^2$ oxide particles, and silicon dioxide ($SiO_2$) are dried at 90 to 110° C., or 100° C., prior to step (a).

Also disclosed is a method of producing hydrogen from methane and carbon dioxide that includes contacting a reactant gas mixture composed of methane and carbon dioxide with any one of the bulk metal oxide catalysts discussed above and/or throughout this specification and producing a gaseous product stream that includes hydrogen and carbon monoxide. Further, there is disclosed a method of catalytically reforming a reactant gas mixture that includes contacting a reactant gas mixture that includes a hydrocarbon and an oxidant, with any one of the bulk metal oxide catalyst and/or or supported metal oxide catalysts discussed above and/or throughout this specification, under conditions sufficient to produce a gaseous mixture that includes carbon monoxide and hydrogen. Such conditions sufficient to produce the gaseous mixture can include a temperature range of 700° C. to 950° C. or a range from 725° C., 750° C., 775° C., 800° C., to 950° C., or from 700° C. to 950° C. or from 750° C. to 900° C., a pressure range of about 1 bara, and/or a gas hourly space velocity (GHSV) ranging from 500 to 100,000 h$^{-1}$. In particular instances, the hydrocarbon includes methane. In certain aspects, the oxidant includes carbon dioxide, oxygen, or any combination thereof. In a particular instance, the hydrocarbon includes methane and the oxidant is carbon dioxide or a mixture of carbon dioxide and oxygen. The ratio of carbon monoxide to hydrogen in the produced gaseous mixture is approximately 0.35:1 to 1:1, or from 0.40:1 to 0.95:1 after 40 hours on the stream. In some instances, the methane conversion can be 10% to 50% after 40 hours on the stream, preferably 25% to 45% after 40 hours on the stream, or most preferably 30% to 45% after 40 hours on the stream at a temperature of 800° C. at a GHSV of 75,000 h$^{-1}$. The carbon dioxide conversion can be 10% to 70% after 40 hours on the stream, preferably 40% to 65% after 40 hours on the stream, or most preferably 45% to 60% after 40 hours on the stream at a temperature of 800° C. at a GHSV of 75,000 h$^{-1}$.

In the context of the present invention 40 embodiments are disclosed. Embodiment 1 is a bulk metal oxide catalyst capable of producing hydrogen ($H_2$) and carbon monoxide (CO) from methane ($CH_4$) and carbon dioxide ($CO_2$). The bulk metal oxide catalyst includes at least two or more metals or two or more compounds thereof ($M^1$, $M^2$) and has an olivine crystal phase or a spinel crystal phase, or both phases, wherein the bulk metal oxide catalyst is capable of producing the $H_2$ and CO from the $CH_4$ and the $CO_2$ under substantially dry conditions. Embodiment 2 is the bulk metal oxide of embodiment 1, wherein $M^1$ can be nickel (Ni) or a compound thereof, and $M^2$ can be manganese (Mn) or a compound thereof. Embodiment 3 is the bulk metal oxide catalyst of embodiment 2, wherein the catalyst includes a nickel-manganese olivine crystal phase having a structure of $(Ni_xMn_{1-x})_2SiO_4$, where x is 0<x≤0.25, preferably 0.1≤x≤0.25. Embodiment 4 is the bulk metal oxide catalyst of embodiment 3, wherein the catalyst further includes a nickel-manganese spinel crystal phase having a structure of $(Ni_xMn_{3-x})O_4$, where x is 0<x≤1, preferably 0.1≤x≤0.25. Embodiment 5 is the bulk metal oxide catalyst of any one of embodiments 3 to 4, further including a metal oxide crystal phase having a structure of $MnSiO_3$. Embodiment 6 is the bulk metal oxide catalyst of embodiment 5, wherein the metal oxide crystal phase having the structure of $MnSiO_3$ is inactive in a carbon dioxide methane reforming reaction. Embodiment 7 is the bulk metal oxide catalyst of embodiment 3, wherein the catalyst consists substantially of or completely of the nickel-manganese olivine crystal phase. Embodiment 8 is the bulk metal oxide catalyst of any one of embodiments 3 to 7, where a molar ratio of manganese to nickel is ≤9 or preferably 3 to 9. Embodiment 9 is the bulk metal oxide catalyst of embodiment 2, wherein the catalyst includes a nickel-manganese spinel crystal phase having a structure of $(Ni_xMn_{3-x})O_4$, where x is 0<x≤1. Embodiment 10 is the bulk metal oxide catalyst of embodiment 9, wherein the catalyst does not include a nickel-manganese olivine crystal phase having a structure of $(Ni_xMn_{1-x})_2SiO_4$, where x is 0<x≤0.25. Embodiment 11 is the bulk metal oxide catalyst of embodiment 10, further including a metal oxide crystal phase having a structure of $MnSiO_3$. Embodiment 12 is the bulk metal oxide catalyst of any one of embodiments 9 to 11, having a molar ratio of manganese to nickel of 3≤50. Embodiment 13 is the bulk metal oxide catalyst of embodiment 1 that includes an olivine crystal phase represented by the formula of: $(M^1_xM^2_{1-x})_2SiO_4$, where x is 0<x≤0.25, preferably 0.1<x≤0.25, wherein $M^1$ and $M^2$ are different. Embodiment 14 is the bulk metal oxide catalyst of embodiment 13, wherein the catalyst consists substantially of or completely of the olivine crystal phase. Embodiment 15 is the bulk metal oxide catalyst of embodiment 13, further including a spinel crystal phase represented by the formula of: $(M^1_xM^2_{3-x})O_4$, where x is 0<x≥1, preferably 0.01≤x≤1, wherein $M^1$ and $M^2$ are different. Embodiment 16 is the bulk metal oxide catalyst of embodiment 13, wherein the catalyst does not include a spinel crystal phase represented by the formula of: $(M^1_xM^2_{3-x})O_4$, where x is 0<x≤1, preferably 0.01≤x≤1, wherein $M^1$ and $M^2$ are different. Embodiment 17 is the bulk metal oxide catalyst of embodiment 1, further including a spinel crystal phase represented by the formula of: $(M^1_xM^2_{3-x})O_4$, where x is 0.01≤x≤1, wherein $M^1$ and $M^2$ are different. Embodiment 18 is the bulk metal oxide catalyst of embodiment 16, wherein the catalyst does not include an olivine crystal phase represented by the formula of: $(M^1_xM^2_{1-x})_2SiO_4$, where x is 0<x≤0.25, wherein $M^1$ and $M^2$ are different. Embodiment 19 is the bulk metal oxide catalyst of any one of embodiments 1 or 13 to 18, wherein $M^1$ includes nickel or any compound thereof and $M^2$ includes manganese, or any compound thereof. Embodiment 20 is the bulk metal oxide catalyst of any one of embodiments 1 to 18, wherein $M^1$ and $M^2$ are each incorporated into the crystal lattice structure of the catalyst. Embodiment 21 is the bulk metal oxide catalyst of any one of embodiments 1 to 20, further including $M^3$, wherein $M^3$ includes a noble metal from Group VIII or a compound thereof, and wherein $M^1$, $M^2$ and $M^3$ are different. Embodiment 21 is the bulk metal oxide catalyst of embodiment 20, wherein $M^3$ includes Pt, Pd, Ru, Rh, Ir, Ag, Au, or any compound thereof. Embodiment 22 is the bulk metal oxide catalyst of any one of embodiments 20 to 21, including an olivine crystal phase represented by the formula of: $(M^1,M^2_{1-x-y},M^3_y)_2SiO_4$ where 0<x≤0.25, 0≤y≤0.05 and 0<(x+y)≤0.25, preferably 0.1≤x≤0.25, 0≤y≤0.05 and 0<(x+y)≤0.25, and $M^1$, $M^2$, and $M^3$ are different. Embodiment 23 is the bulk metal oxide catalyst of any one of embodiments 20 to 22 that includes a spinel crystal phase represented by the formula of: $(M^1_x, M^2_{3-x-y}, M^3_y)O_4$ where 0<x≤1, 0≤y≤0.05 and 0<(x+y)≤1, preferably 0.01≤x≤1, 0≤y≤0.05 and 0<(x+y)≤1 and $M^1$, $M^2$, and $M^3$ are different. Embodiment 24 is the bulk metal oxide catalyst of any one of embodiments 1 to 23, wherein the catalyst has an olivine or spinel crystal phase, preferably an olivine crystal phase, wherein the olivine crystal phases has a crystal structure that includes hexagonal close packed arrays of oxygen anions ($O^-$) in that one-half of the octahedral interstices are occupied by $M^1$, $M^2$, and/or $M^3$ cations ($M^{1+}$, $M^{2+}$, and/or $M^{3+}$) and one-eighth of the tetrahedral interstices are occupied by Si cations ($Si^+$). Embodiment 25 is the bulk metal oxide catalyst of any one of claims 1 to 24, wherein the catalyst is valence neutral. Embodiment 26 is the bulk metal oxide catalyst of any one of embodiments 1 to 25, wherein the catalyst is resistant to coke formation at 1 bar and 800° C. reaction conditions at least up to 500 hours on the stream. Embodiment 27 is the bulk metal oxide catalyst of any one of embodiments 1 to 26, wherein at least one of the metals of the bulk metal oxide catalyst is inhibited from sintering upon heating of the bulk metal oxide catalyst. Embodiment 28 is the bulk metal oxide catalyst of any one of embodiments 1 to 27, wherein the nickel is inhibited from sintering upon heating of the bulk metal oxide catalyst. Embodiment 29 is the bulk metal oxide of any one of embodiments 1 to 28, wherein the bulk metal oxide catalyst is comprised in a reactant composition that includes $CH_4$. Embodiment 30 is the bulk metal oxide of any one of embodiments 1 to 29, wherein the bulk metal oxide catalyst is comprised in a reactant composition that includes $CO_2$.

Embodiment 31 is a method of producing $H_2$ and CO that can include contacting a reactant gas stream that includes $CH_4$ and $CO_2$ with any one of the metal oxide bulk catalysts of embodiments 1 to 30 under substantially dry reaction conditions sufficient to produce a product gas stream that includes $H_2$ and CO. Embodiment 32 is the method of embodiment 31, wherein a ratio of $H_2$ to CO ranges from 0.4 to 0.95 after 40 hours on the stream. Embodiment 33 is the method of any one of embodiments 31 to 32, wherein coke formation on the metal oxide bulk catalyst is substantially or completely inhibited. Embodiment 34 is the method of any one of embodiments 31 to 33, wherein methane conversion is 10% to 50% after 40 hours on the stream, preferably 25% to 45% after 40 hours on the stream, or most preferably 30% to 45% after 40 hours on the stream at a temperature of 800° C. at a GHSV of 75,000 $h^{-1}$. Embodiment 35 is the method of any one of embodiments 31 to 34, wherein carbon dioxide conversion is 10% to 70% after 40 hours on the stream, preferably 40% to 65% after 40 hours on the stream, or most preferably 45% to 60% after 40 hours on the stream at a temperature of 800° C. at a GHSV of 75,000 $h^{-1}$. Embodiment 36 is the method of any one of embodiments 34 to 38, wherein the reaction conditions include a temperature of about 700° C. to about 950° C., a pressure of about 1 bara, and a gas hourly space velocity ranging from about 500 to about 100,000 $h^{-1}$.

Embodiment 37 is a method of making a bulk metal oxide of any one of embodiments 1 to 30. The method includes (a) obtaining a mixture that includes $M^1$ oxide particles, silicon dioxide particles, and $M^2$ oxide particles, and wherein the molar ratio of $M^2$:Si is 1:1 to 3:1 and the molar ratio of $M^1$:$M^2$ is 0.01 to 0.5; and (b) calcining the mixture at a temperature of 1000° C. to 1500° C., preferably 1200° C. to 1300° C., for a sufficient period of time to obtain a bulk catalyst having a $M^1$-$M^2$ olivine crystal phase or a $M^1$-$M^2$ spinel crystal phase, or a combination thereof. Embodiment 38 is the method of embodiment 37, wherein the mixture in step (a) is ground to a powder and formed into a pellet prior to step (b), and wherein the pellet is subjected to step (b). Embodiment 39 is the method of embodiment 38, wherein the pellet is calcined at a temperature of about 1100° C. to 1275° C. for about 22 to 48 hours and subsequently cooled to room temperature. Embodiment 40 is the method of any one of embodiments 38 to 39, wherein the pellet, subsequent to step (b), is ground into a powdered form.

The following includes definitions of various terms and phrases used throughout this specification.

The terms "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "bulk metal oxide catalyst" as that term is used in the specification and/or claims, means that the catalyst includes at least one metal, and does not require a carrier or a support.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The catalysts of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the catalysts of the present invention are their abilities to catalyze dry reforming of methane.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

The currently available catalysts used to reform hydrocarbons into syngas are prone to sintering and coking, which can lead to inefficient catalyst performance and ultimately failure of the catalyst after relatively short periods of use. This can lead to inefficient syngas production as well as increased costs associated with its production.

A discovery has been made that avoids the sintering issues. The discovery is based on the use of bulk metal oxide catalysts having an olivine crystal phase, a spinel crystal phase, or both phases. Without wishing to be bound by theory, it is believed that the solid state synthesis method and special calcination conditions to produce a catalyst having an olivine phase can reduce or prevent agglomeration of the catalytic material, thereby reducing or preventing sintering of the materials.

These and other non-limiting aspects of the present invention are discussed in further detail in the following sections.

A. Crystal Phases

1. Olivine Phases

Figure 1:
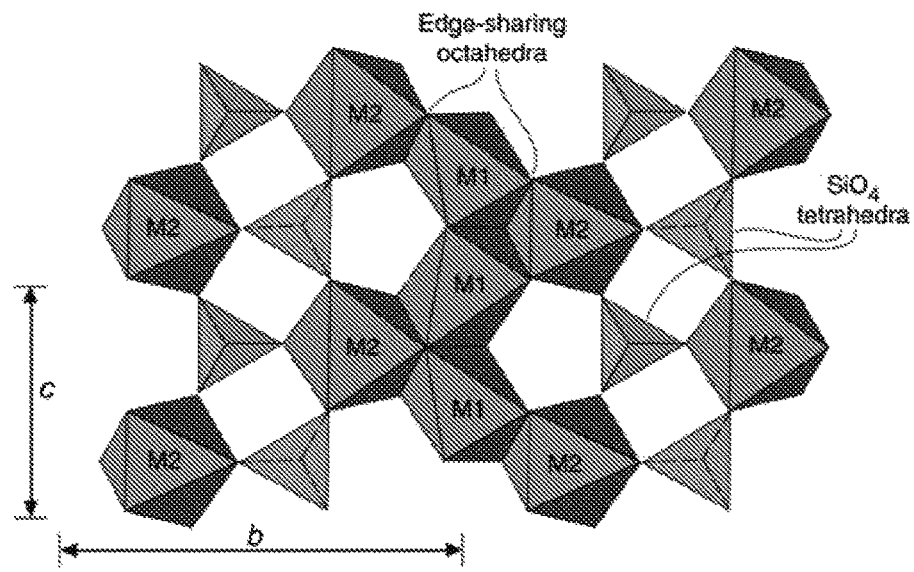
FIG. 1 depicts a polyhedral structure of an olivine structure that includes nesosilicate $(SiO_4)^{4-}$ and two metal cations.

The bulk metal catalysts of the present invention can have an olivine crystal phase. In the olivine crystal phase, the counter ions (cationic metals) can be coordinated by the four oxygen ions of the silicate anions $((SiO_4)^{4-})$. The coordination with the cationic metals with the four oxygen atoms provides the olivine crystal phase. In the olivine crystal structure, the $SiO_4^{4-}$ anions can be isolated from each other (i.e., the Si cations do not share oxygen atoms). The olivine structure can be characterized by hexagonal close packed arrays of $O^-$ anions in that one-half of the octahedral interstices are occupied by the cations of the metals of the invention, and one-eighth of the tetrahedral interstices are occupied by Si cations. FIG. 1 depicts a polyhedral structure of an olivine structure that includes nesosilicate $((SiO_4)^{4-})$ and two metal cations. Bulk metal oxide catalyst of the present invention can be prepared by heating silicon dioxide at high temperatures in the presence of other metal oxides to produce nesosilicate phases (i.e., olivine phases). A non-limiting structure of the olivine phase is provided below in Formulas (I) and (II).

2. Spinel Phases

Figure 2:
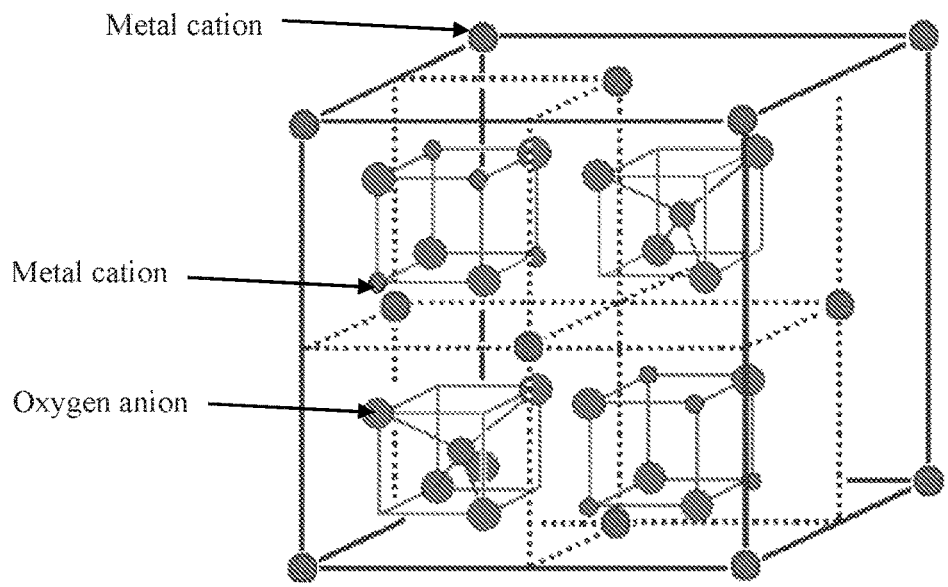
FIG. 2 depicts a cubic closed packed array structure of a spinel having the general formula $AB_2O_4$, where A and B are metal cations.

The bulk metal catalysts of the present invention can have a spinel crystal phase. Spinel structures can be characterized as having a cubic close packing (ccp) array of oxide ions. In the spinel structure, oxygen $(O^-)$ anions form a the ccp array (lattice) and the metals (e.g., $M^1$, $M^2$ of the present invention) sit in tetrahedral (⅛ occupied) and octahedral (½ occupied) sites in the lattice. FIG. 2 depicts a structure of a spinel having the general structure $AB_2O_4$, where A and B are metal cations. Spinels of the present invention can be prepared by heating $M^1$ (e.g., nickel oxide) and $M^2$ (e.g., manganese oxide) at high temperatures in the solid phase. A non-limiting structure of the spinel phase is provided below in Formulas (III) and (IV).

B. Metals

The metals that can be used in the context of the present invention to create bulk metal oxides or supported catalysts include: (1) manganese or a compound thereof (e.g., manganese oxide such as MnO), with manganese oxide being preferred; and (2) nickel or a compound thereof (e.g., nickel oxide such as $Ni_2O_3$), with nickel oxide being preferred. These metals or metal compounds can be purchased from any chemical supplier such as Sigma-Aldrich (St. Louis, Mo., USA), Alfa-Aeaser (Ward Hill, Mass., USA), Strem Chemicals (Newburyport, Mass., USA).

Metal catalysts for the production of hydrogen and carbon monoxide from hydrocarbons and carbon dioxide include two or more of the above described metal or metals compounds in combination with nesosilicate. Catalytic material can be mixed with the nesosilicate or with a nesosilicate precursor. Catalytic material includes a catalytic metal, such as MnO and NiO. The catalyst can have an olivine crystal phase, a spinel crystal phase, or both phases. The olivine crystal phase can have an overall formula of:

$$(M^1_x M^2_{1-x})_2 SiO_4 \quad (I)$$

where $0<x\leq0.25$, preferably $0.1<x\leq0.25$, and $M^1$ and $M^2$ are different;

or

$$(M^1_x, M^2_{1-x-y}, M^3_y)_2 SiO_4 \quad (II)$$

where $0<x\leq0.25$, $0\leq y\leq0.05$ and $0<(x+y)\leq0.25$, preferably $0.1<x\leq0.25$, $0\leq y\leq0.05$ and $0.1<(x+y)\leq0.25$, and $M^1$, $M^2$, and $M^3$ are different. $M^1$ can be nickel (Ni) or a compound thereof, and $M^2$ can be manganese (Mn) or a compound thereof. As shown in formula (II), the ratio of $M^1$, $M^2$, to $M^3$ is adjusted to compensate for the third metal. The third metal ($M^3$) can be a noble metal. In preferred embodiments, $M^1$ is nickel, $M^2$ is manganese, and $M^3$ is a noble metal (e.g., Ru, Rh, Ir Pd, Pt, Ag, or Au). It should be understood, that the number of metals can be varied as long as the empirical formula for the olivine structure $(AB)_2SiO_4$, where A and B are metals, is preserved.

The spinel crystal phase can have an overall formula of:

$$M^1_x M^2_{3-x} O_4 \quad (III)$$

where x is $0<x\leq1$, preferable $0.01<x\leq1$, and $M^1$, $M^2$, and $M^3$ are different, or

$$(M^1_x, M^2_{3-x-y}, M^3_y) O_4 \quad (IV)$$

where $0<x\leq1$, $0\leq y\leq0.05$ and $0<(x+y)\leq1$, preferably $0.01\leq x\leq1$, $0\leq y\leq0.05$ and $0<(x+y)\leq1$, and $M^1$, $M^2$, and $M^3$ are different.

As shown in formula (IV), the ratio of $M^1$, $M^2$, to $M^3$ is adjusted to compensate for the third metal. The third metal can be a noble metal. In preferred embodiments, $M^1$ is nickel, $M^2$ is manganese, and $M^3$ is a noble metal (e.g., Ru, Rh, Ir Pd, Pt, Ag, or Au). It should be understood, that the number of metals can be varied as long as the empirical formula for the spinel structure $AB_2O_4$, where A and B are metals, is preserved. In some instances, the catalyst includes some $M^2SiO_3$, which has little to no catalytic activity.

C. Preparation of Catalysts

The bulk metal oxide catalyst of the present invention can be made by processes that provide an olivine lattice structure, for example, a solid state reaction with catalytic and/or base metals, and silicon oxide. A non-limiting example includes, mixing a 1:1 to 3:1 molar ratio, preferably, a 2:1 molar ratio, of $M^2$ and Si oxides (for example, MnO and $SiO_2$) until a homogeneous powder is formed. The $M^1$ metal oxide can be added after mixing the $M^2$ and silicon dioxide, or to a master batch of the powdered mixture of $M^2$ oxide and silicon dioxide. In some embodiments (for example, when a high (greater than 8, preferably greater than 9) olivine/spinel ratio is desired), $M^1$, $M^2$ and Si oxides are dried at an average temperature of 90 to 110° C., or 95 to 105° C., or 100° C. The amount of $M^1$ is based on the molar amount of silicon (Si) and the amount of $M^2$ is adjusted so that the overall molar ratio of catalytic metal ($M^1$+$M^2$) to Si is from 1:1 to 2:1. In some aspects of the invention, a molar ratio of $M^1$ to $M^2$ can range from 0.01 to 0.5, or 0.02, 0.03, 0.04, 0.05, 0.06, 0.07, 0.08, 0.09, 0.1, 0.15, 0.2, 0.25, 0.3, 0.35, 0.4, 0.45, or 0.5. Said another way, the molar ratio of $M^2$ to $M^1$ ranges from 3 to <50, or 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or any value there between. In a particular instance, the $M^2$ to $M^1$ (e.g., Mn/Ni) molar ratio is from 3 to 9, 4 to 8, or 5 to 7. For example, nickel oxide is added to the powdered mixture based on the molar amount of manganese in the mixture and the overall molar ratio of the catalytic metals to silicon. In embodiments when a noble metal is added as a third metal, the amount of at least one other catalytic material (for example, $M^2$) is adjusted such that the overall molar ratio of catalytic metal ($M^1+M^2$) to Si is from 1:1 to 3:1 (i.e., ($M^1+M^2+M^3$) to Si molar ratio). For example, the amount of noble metal can be adjusted such that to meet the formula for the olivine crystal phase of the catalyst is $M^1{}_x,M^2{}_{1-x-y},M^3{}_y)_2SiO_4$ where $0<x\leq0.25$, $0\leq y\leq0.05$ and $0<(x+y)\leq0.25$, and $M^1$, $M^2$, and $M^3$ are different. The powdered homogeneous mixture can be dried at temperatures at about 115° C. to about 125° C. for 8 to 12 hours. The dried mixture can be mixed with force (for example, grinding, milling, or crushing), and then molded under a pressure of about 8 Tons-force/sq.inch to about 12 Tons-force/sq.inch (110 MPa to 185 MPa) to form pellets. The pellets may be any shape or size (for example, cylindrical, rods, round, elliptical, etc.). The pellets can be calcined by heating the pellets to a temperature between 1200° C. and 1500° C., with 1200° C. and 1300° C. being preferred, at a rate of 1° C. per minute and holding at between 1200° C. and 1500° C. for 24 hours, and then cooled at a rate of about 1° C. per minute to ambient temperature (about 72° C.). In a preferred aspect of the invention, the calcining temperature is 1250° C. The calcining and cooling treatment can be repeated 2, 3, 4, 5 or multiple times. The calcined pellets are then powdered using force (for example, crushed and ground). The resulting catalyst has an olivine structure that has discrete $SiO_4{}^{4-}$ anions in the crystal lattice, where the O anions of the silicate are coordinated with the metals of the invention, or a discrete spinel structure, or is a mixture of both. In a preferred aspect of the invention, the catalyst is substantially olivine in structure.

The bulk metal catalysts of the present invention can be put on a support. Supported metal catalyst of the present invention can be made by generally known catalyst preparation techniques. In some embodiments, the support may be combined with the catalytic metal to form a catalyst.

In one instance, naturally occurring olivine minerals can be used as supports for the metals of the invention. Examples of olivine minerals that can be used as supports include, but are not limited to, the minerals of forsterite ($Mg_2SiO_4$), monticelite ($CaMgSiO_4$), calcio-olivine ($Ca_2SiO_4$), lienbergite ($NiMgSiO_4$), glaucochroite ($CaMn^{2+}SiO_4$), and any combination thereof. In a particular aspect of the invention, the support does not include iron or iron compounds. In some aspects of the invention, the support can be heat-treated at temperatures prior to combining with a metal of the invention. In some embodiments, impregnation aids may be used during preparation of the catalyst. In certain embodiments, the support may be combined with a metal solution. The metal solution may be mixed with the support and/or sprayed on the support. The metal solution can include Group VIII metals or Group VIII metal compounds, for example, Ni. In some aspects, the metal solution includes Group VIII metals or metal compounds in combination with noble metals, such as Pt and/or Pd. In certain aspects, the metal solution includes Ni, Pt, Pd, Sc, Zr, Mo, Cr, Ru, Os, Rh, Ir, La, Ce, Dy, Tm, Yb, Lu, Co, or any combination thereof. The amount of metal or metal precursor is chosen such that supported catalyst has a total metal content of from 5-15 wt. %. In a non-limiting example, the catalyst is prepared using an incipient impregnation technique. The metal impregnated support can be dried at 80 to 120° C. for about 1 to 3 hours. The dried catalyst can be heat treated (e.g., calcined) at a temperature ranging from 800° C. to about 900° C. for about 3 hours or a time determined to be sufficient to oxide the metals impregnated on the support.

As illustrated in the Examples section, the produced bulk metal oxide catalyst of the invention are sinter and coke resistant materials at elevated temperatures, such as those typically used in syngas production or methane reformation reactions (e.g., 700° C. to 950° C. or a range from 725° C., 750° C., 775° C., 800° C., 900° C., to 950° C.). Further, the produced catalysts can be used effectively in carbon dioxide reforming of methane reactions at a temperature range from 700° C. to 950° C. or from 800° C. to 900° C., a pressure range of 1 bara, and/or at a gas hourly space velocity (GHSV) range from 500 to 10000 $h^{-1}$, preferably a temperature of 800° C., a pressure of 1 bara, and a GHSV of 75,000 $h^{-1}$.

D. Carbon Dioxide Reforming of Methane

Also disclosed is a method of producing hydrogen and carbon monoxide from methane and carbon dioxide. The method includes contacting a reactant gas mixture of a hydrocarbon and oxidant with any one of the bulk metal oxide catalysts and/or or supported metal oxide catalysts discussed above and/or throughout this specification under sufficient conditions to produce hydrogen and carbon monoxide at a ratio of 0.35 or greater, from 0.35 to 0.95, or from 0.6 to 0.9. Such conditions sufficient to produce the gaseous mixture can include a temperature range of 700° C. to 950° C. or a range from 725° C., 750° C., 775° C., 800° C., to 900° C., or from 700° C. to 950° C. or from 750° C. to 900° C., a pressure range of about 1 bara, and/or a gas hourly space velocity (GHSV) ranging from 500 to 100,000 $h^{-1}$ or a range from 500 $h^{-1}$, 1000 $h^{-1}$, 5000 $h^{-1}$, 10,000 $h^{-1}$, 20,000 $h^{-1}$, 30,000 $h^{-1}$, 40,000 $h^{-1}$, 50,000 $h^{-1}$, 60,000 $h^{-1}$, 70,000 $h^{-1}$, 80,000 $h^{-1}$, 90,000 $h^{-1}$, to 100,000 $h^{-1}$. In a particular instance, a temperature of 800° C., a pressure of 1 bara, and a GHSV of 75,000 $h^{-1}$ is used. In particular instances, the hydrocarbon includes methane and the oxidant is carbon dioxide. In other aspects, the oxidant is a mixture of carbon dioxide and oxygen. In certain aspects, the carbon formation or coking is reduced or does not occur on the bulk metal oxide catalyst or the supported catalyst and/or sintering is reduced or does not occur on the bulk metal oxide catalyst or the supported catalyst. In particular instances, carbon formation or coking and/or sintering is reduced or does not occur when the bulk metal oxide catalyst is subjected to temperatures at a range of greater than 700° C. or 800° C. or a range from 725° C., 750° C., 775° C., 800° C., 900° C., to 950° C. In particular instances, the range can be from 700° C. to 950° C. or from 750° C. to 900° C. at a pressure of 1 bara. Without wishing to be bound by theory it is believed that no or substantially little sintering occurs because the active sites are incorporated into the framework (bulk catalyst) and there is no metallic particle deposition.

In instances when the produced catalytic material is used in dry reforming methane reactions, the carbon dioxide in the gaseous feed mixture can be obtained from various sources. In one non-limiting instance, the carbon dioxide can be obtained from a waste or recycle gas stream (e.g. from a plant on the same site, like for example from ammonia synthesis) or after recovering the carbon dioxide from a gas stream. A benefit of recycling such carbon dioxide as starting material in the process of the invention is that it can reduce the amount of carbon dioxide emitted to the atmosphere (e.g., from a chemical production site). The hydrogen in the feed may also originate from various sources, including streams coming from other chemical processes, like ethane cracking, methanol synthesis, or conversion of methane to aromatics. The gaseous feed mixture comprising carbon dioxide and hydrogen used in the process of the invention may further contain other gases, provided that these do not negatively affect the reaction. Examples of such other gases include oxygen and nitrogen. The gaseous feed mixture has is substantially devoid of water or steam. In a particular aspect of the invention the gaseous feed contains 0.1 wt. % or less of water, or 0.0001 wt. % to 0.1 wt. % water. The hydrocarbon material used in the reaction can be methane. The resulting syngas can then be used in additional downstream reaction schemes to create additional products. Such examples include chemical products such as methanol production, olefin synthesis (e.g., via Fischer-Tropsch reaction), aromatics production, carbonylation of methanol, carbonylation of olefins, the reduction of iron oxide in steel production, etc.

The reactant gas mixture can include natural gas, liquefied petroleum gas comprising $C_2$-$C_5$ hydrocarbons, $C_6$+ heavy hydrocarbons (e.g., $C_6$ to $C_{24}$ hydrocarbons such as diesel fuel, jet fuel, gasoline, tars, kerosene, etc.), oxygenated hydrocarbons, and/or biodiesel, alcohols, or dimethyl ether. In particular instances, the reactant gas mixture has an overall oxygen to carbon atomic ratio equal to or greater than 0.9.

The method can further include isolating and/or storing the produced gaseous mixture. The method can also include separating hydrogen from the produced gaseous mixture (such as by passing the produced gaseous mixture through a hydrogen selective membrane to produce a hydrogen permeate). The method can include separating carbon monoxide from the produced gaseous mixture (such as passing the produced gaseous mixture through a carbon monoxide selective membrane to produce a carbon monoxide permeate).

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of Olivine/Spinel Catalysts

Figure 3:
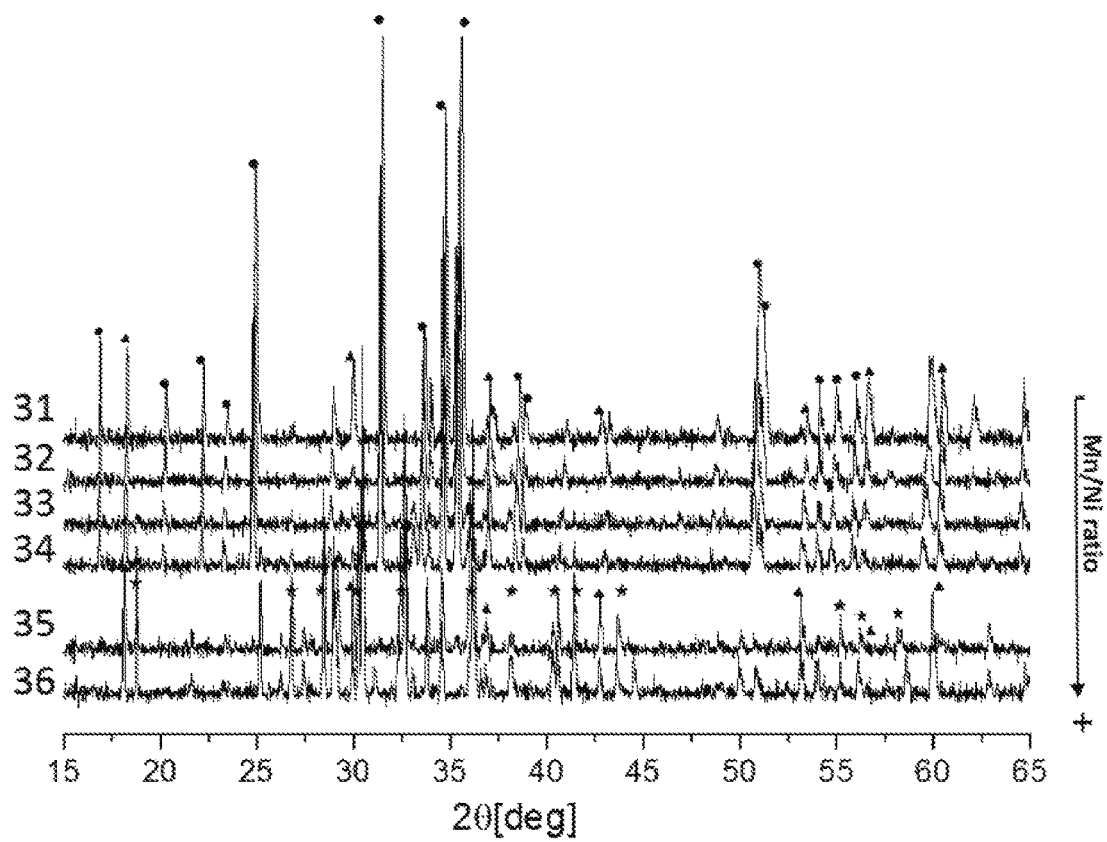
FIG. 3 shows X-Ray Diffraction (XRD) patterns of various bulk metal oxide catalysts of the present invention and mixed manganese silicon oxides.

All chemical precursors used for the olivine based catalyst were obtained from Sigma Aldrich®, USA. Manganese oxide and silicon dioxide in the molar ratios shown below in Table 1 were mixed together to form a homogeneous powder of MnO and $SiO_2$. Nickel oxide was added in amounts sufficient to prepare a mixture of nickel oxide, manganese oxide, and silicon dioxide as shown in Table 1. The amount of nickel and manganese was based on the moles of silicon and the amount of manganese was adjusted such that the overall molar ratio of catalytic metal (Mn+Ni) to Si was 2:1. The homogeneous powder was dried at 120° C. for 10 hours. The dried material was ground to a fine powder, and then pelletized (i.e., molded) with an infrared press at a pressure of about 10 tons to form cylindrical pellets. The formed pellets were calcined at 1250° C. at a ramp rate of 1° C. per minute, held at 1250° C. for 24 hours, and then cooled slowly to room temperature. The calcining and cooling cycle was repeated. The calcined pellets were crushed and ground to form a fine crystalline powder of the "NiMn" catalyst. FIG. 3 are X-Ray Diffraction (XRD) patterns 31-36 of various bulk metal oxide catalysts of the invention and MnSi or MnO phases. Pattern 31 is for sample 1, pattern 32 is for sample 2, pattern 33 is for sample 3, pattern 34 is for sample 4, pattern 35 is for sample 5, and pattern 36 is for sample 6. The peaks identified with circles are $Mn_2SiO_4$, the peaks identified with triangles are $NiMn_2O_4$ (spinel phase), and the peaks identified with stars are $MnSiO_3$. Patterns 31 and 32 show the phase's determination of the $n_{mn}$ in $_m$ ratio of infinity (sample 1) and 19 (sample 2), respectively. All the peaks in patterns 31 and 32 can be attributed to the 2 phases, which are $Mn_3O_4$ (spinel) and $MnSiO_3$. Pattern 31 (sample 1) had a composition of 25 wt. % $Mn_3O_4$ and 75 wt. % $MnSiO_3$. Pattern 31 (sample 2) had composition of 15 wt. % of $(Ni_xMn_{1-x})_2SiO_4$ and 85 wt. % $MnSiO_3$. The addition of nickel modified the intensity of several peaks, but did not change the crystalline phases. Patterns 33-36 (samples 3, 4, 5, and 6) all include $(Ni_xMn_{1-x})_2SiO_4$ and as shown in FIG. 3, which is exactly similar to an XRD pattern of natural olivine mineral.

TABLE 1

| Sample No. | Material Name | $SiO_2$ Moles | MnO Moles | NiO Moles | $n_{Mn}/n_{Ni}$ (Molar Ratio) | Crystal Phases |
|---|---|---|---|---|---|---|
| 1 | $Mn_2Si$ | 1 | 2 | 0 | ∞ | $Mn_3O_4$ $MnSiO_3$ |
| 2 | $Mn_{1.9}Si$—$Ni_{0.1}$ | 1 | 1.9 | 0.1 | 19 | $MnSiO_3$ $Ni_xMn_{3-x}O_4$ |
| 3 | $Mn_{1.8}Si$—$Ni_{0.2}$ | 1 | 1.8 | 0.2 | 9 | $MnSiO_3$ $Ni_xMn_{3-x}O_4$ $(Ni_xMn_{1-x})_2SiO_4$ |
| 4 | $Mn_{1.7}Si$—$Ni_{0.3}$ | 1 | 1.7 | 0.3 | 5.7 | $MnSiO_3$ $Ni_xMn_{3-x}O_4$ $(Ni_xMn_{1-x})_2SiO_4$ |
| 5 | $Mn_{1.6}Si$—$Ni_{0.4}$ | 1 | 1.6 | 0.4 | 4 | $MnSiO_3$ $Ni_xMn_{3-x}O_4$ $(Ni_xMn_{1-x})_2SiO_4$ |
| 6 | $Mn_{1.5}Si$—$Ni_{0.5}$ | 1 | 1.5 | 0.5 | 3 | $MnSiO_3$ $Ni_xMn_{3-x}O_4$ $(Ni_xMn_{1-x})_2SiO_4$ |

Example 2

Synthesis of Olivine Catalysts

Chemical precursors used for the olivine based catalyst were, NiO (from Alfa Aesar®, USA), MnO (from Sigma Aldrich®, USA) and $SiO_2$ (40-63 µm from SilicAR, Barranquilla, Colombia). Noble metal precursors of silver oxide (AgO), ruthenium chloride hydrate ($RuCl_3 \cdot xH_2O$), iridium chloride hydrate ($IrCl_3 \cdot xH_2O$), sodiumhexachloroplatinate hydrate ($Na_2PtCl_6 \cdot 6H_2O$), ruthenium chloride ($RhCl_3$) and palladium chloride ($PdCl_2$) were obtained from Sigma Aldrich®, USA.

1. Olivine Catalysts (($Ni_xMn_y)SiO_4$, with x+y=1)

General Procedure. All the reactants were dried at 110° C. under air overnight. Then, the mixtures of Mn:Si in a molar ratio of 2:1 were prepared. Manganese oxide (MnO, 2.3 g) and silicon dioxide ($SiO_2$, 1.2 g) were mixed together thoroughly in a mortar to form a homogeneous powder. NiO was added with different molar ratio, ranging from 0 to 0.5 mole, with respect to the mole of manganese. Then the mixture was transferred to a crucible and dried at 120° C. for 10 h. After this, the material was grounded to fine powder in a mortar, and finally pelletized with a hydraulic press at an operating pressure of 8 tons-force/(sq.inch) to form cylindrical pellets. The formed pellets were then transferred into a crucible and calcined to 1250° C. at a ramp rate of 1° C. per minute, held at that temperature for 24 h and finally cooled down slowly to room temperature. The grinding and calcination procedure were repeated twice.

Figure 4:
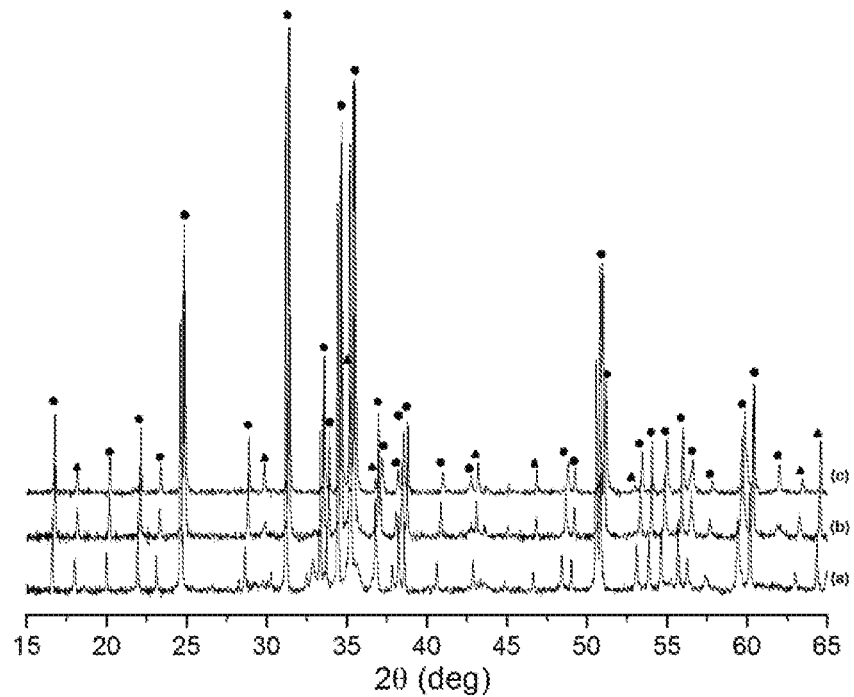
FIG. 4 shows the XRD patterns of Ni—Mn olivine: (a) $(Ni_{0.1}Mn_{0.9})_2SiO_4$ (b) $(Ni_{0.15}Mn_{0.85})_2SiO_4$, (c) $(Ni_{0.25}Mn_{0.75})_2SiO_4$ [circle: $Mn_2SiO_4$ olivine, triangle: $NiMn_2O_4$ spinel].

All the olivine based catalysts were prepared by following the same method. Table 2 lists the catalyst, catalyst composition and Ni/Mn ratio of the Ni/Mn olivine catalyst. FIG. 4 shows the XRD patterns of Ni—Mn olivine: (a) $(Ni_{0.1}Mn_{0.9})_2SiO_4$ (b) $(Ni_{0.15}Mn_{0.85})_2SiO_4$, (c) $(Ni_{0.25}Mn_{0.75})_2SiO_4$ [circle: $Mn_2SiO_4$ olivine, triangle: $NiMn_2O_4$ spinel]. By using the protocol described above, the Ni—Mn olivine yield was increased over Ni—Mn spinel in Example 1. Indeed, the ratio of the relative area for the 2 first peaks, at 2θ=16.7° (refers to olivine phase) and 2θ=18.7° (refers to spinel phase), increase by two comparing to the previously reported data. In this work, the wt % of Ni varied from 0.01 to 14.45 wt %. Even at high Ni content, NiO was not detected. Without wishing to be bound by theory, it is believed that the Ni completely incorporated into the olivine lattice. At low $n_{Mn}/n_{Ni}$ ratio, peaks at high 2θ(50°-90°) start to shift on the right. One possible explanation could be the incorporation of the Ni into the olivine structure.

TABLE 2

| Catalyst | Composition | Ni/Mn ratio |
|---|---|---|
| Ni—Mn Olivine | $(Ni_{0.15}Mn_{0.85})_2SiO_4$ High Olivine/Spinel ratio | 0.17 |
| Ni—Mn Olivine | $(Ni_{0.2}Mn_{0.8})_2SiO_4$ High Olivine/Spinel ratio | 0.25 |
| Ni—Mn Olivine | $(Ni_{0.25}Mn_{0.75})_2SiO_4$ High Olivine/Spinel ratio | 0.33 |

2. Nobel Metal Olivine's Catalyst (M-Ni/Mn-olivine, where M=Pt, Pd, Ag, Ru, Ir and Rh)

From the above olivine catalysts, the olivine catalyst with the best Ni/Mn ratio (Ni/Mn=0.17), which gave the highest crystalline Ni—Mn olivine phase, was selected to be doped with noble metals. Six different materials were synthesized with 6 different noble metal precursors.

General Procedure, exemplified with Ru—Ni—Mn Olivine. All the reactants were dried at 110° C. under air over night. Then, the mixtures of (noble metal: Ni:Mn:Si) in a molar ratio of (0.02:0.28:1.7:1) were prepared. Manganese oxide (MnO, 2.93 g), silicon dioxide ($SiO_2$, 1.46 g), NiO (0.5 g) and of $RuCl_3 \cdot xH_2O$ (0.1 g) were mixed together thoroughly in a mortar to form a homogeneous powder. Then, the mixture was transferred to a crucible and dried at 120° C. for 10 h. After drying, the material was grounded to fine powder with the help of a mortar and pressed by hydraulic press to form cylindrical pellets with an operating pressure of 8 tons-force/(sq. inch). The shaped catalyst was transferred into a crucible and calcined at 1250° C. with a ramp rate of 1° C. per minute, held at that temperature for 24 h and cooled down to room temperature. This procedure was repeated twice.

Figure 5:
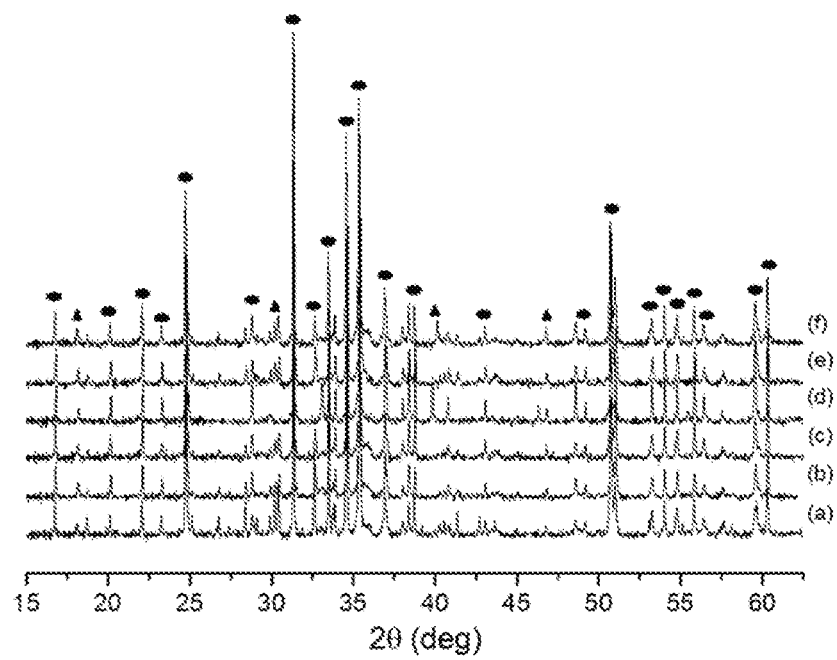
FIG. 5 shows the XRD pattern of Ni—Mn olivine: (a) $(Ag_{0.02}Ni_{0.28}Mn_{01.7})SiO_4$, (b) $(Ru_{0.02}Ni_{0.28}Mn_{01.7})SiO_4$, (c), $(Ir_{0.02}Ni_{0.28}Mn_{01.7})SiO_4$, (d) $(Pt_{0.02}Ni_{0.28}Mn_{01.7})SiO_4$, (e) $(Rh_{0.02}Ni_{0.28}Mn_{01.7})SiO_4$, (f) $Pd_{0.02}Ni_{0.28}Mn_{01.7})SiO_4$ [circle: $Mn_2SiO_4$ olivine, triangle: $NiMn_2O_4$ spinel].

All the noble metal olivine based catalysts were prepared by following the same method except the amount and the kind of noble metal precursor. Table 3 lists the catalyst, catalyst composition and Ni/Mn ratio of the noble metal olivine catalyst. FIG. 5 shows the XRD pattern of Ni—Mn olivine: (a) $(Ag_{0.02}Ni_{0.28}Mn_{01.7})SiO_4$, (b) $(Ru_{0.02}Ni_{0.28}Mn_{01.7})SiO_4$, (c), $(Ir_{0.02}Ni_{0.28}Mn_{01.7})SiO_4$, (d) $(Pt_{0.02}Ni_{0.28}Mn_{01.7})SiO_4$, (e) $(Rh_{0.02}Ni_{0.28}Mn_{01.7})SiO_4$, (f) $Pd_{0.02}Ni_{0.28}Mn_{01.7})SiO_4$ [circle: $Mn_2SiO_4$ olivine, triangle: $NiMn_2O_4$ spinel]. It can be noticed that a low amount of spinel was obtained in all cases. The intensity ratio between the olivine's peak at 2θ=16.7° and the spinel peak at 2θ=18.7° vary from 2 to 5. Moreover, neither NiO nor noble metal oxide, except for the Pt, was detected, suggesting a complete incorporation of these metals into the olivine lattice. XRD pattern (d), Pt—Ni/Mn olivine, shows two peaks at 2θ=39.8° and 2θ=48.6° inferring segregation of Pt on the olivine surface.

TABLE 3

| Catalyst | Composition | Ni/Mn ratio |
|---|---|---|
| Ag—Ni/Mn Olivine | $Ag_{0.02}(Mn_{1.7}Ni_{0.28})SiO_4$ | 0.16 |
| Ru—Ni/Mn Olivine | $Ru_{0.02}(Mn_{1.7}Ni_{0.28})SiO_4$ | 0.16 |
| Ir—Ni/Mn Olivine | $Ir_{0.02}(Mn_{1.7}Ni_{0.28})SiO_4$ | 0.16 |
| Pt—Ni/Mn Olivine | $Pt_{0.02}(Mn_{1.7}Ni_{0.28})SiO_4$ | 0.16 |
| Rh—Ni/Mn Olivine | $Rh_{0.02}(Mn_{1.7}Ni_{0.28})SiO_4$ | 0.16 |
| Pd—Ni/Mn Olivine | $Pd_{0.02}(Mn_{1.7}Ni_{0.28})SiO_4$ | 0.16 |

Example 3

Dry Reforming of Methane with Olivine/Spinel Bulk Metal Catalysts of the Invention General testing procedure. The effectiveness of catalysts of the invention towards carbon dioxide reforming of methane (CDRM, dry reforming of methane) were tested using a high throughput reactor system (hte, GmbH, Heidelberg, Germany). The reactors were of a plug flow design and constructed of steel with ceramic liners. The ceramic liner was 5 mm in diameter and 60 cm in length. The ceramic liner is considered to be inert and used to inhibit steel catalyzed cracking of methane. Catalyst pellets were crushed and sieved to a particle size of 300-500 micrometers. A required amount of catalyst sieve fraction was placed on top of inert material inside the ceramic liner. The catalyst in its oxidized state was heated to about 800° C. in the presence of 90% nitrogen ($N_2$) and 10% Ar. A mixture of 45% $CO_2$+45% $CH_4$+10% Argon (Ar) was used as feed.

The mixture was provided to the reactor in 4 steps with 5 minute intervals, replacing the feed with equivalent amounts of nitrogen during the interludes. The reaction conditions are specified in the individual Examples. Gas chromatography was used for gas analysis with Ar being the internal standard. Methane and $CO_2$ conversion was calculated as follows:

$$CH_4 \text{ conversion} = \frac{\text{moles of methane converted}}{\text{moles of methane in feed}} \times 100$$

$$CO_2 \text{ conversion} = \frac{\text{moles of carbon dioxide converted}}{\text{moles of carbon dioxide in feed}} \times 100$$

The ratio of hydrogen ($H_2$) to carbon monoxide (CO) was calculated as follows $$H_2/CO \text{ ratio} = \frac{\text{moles of } H_2 \text{ in product}}{\text{moles of CO in product}} \times 100$$

Figure 6:
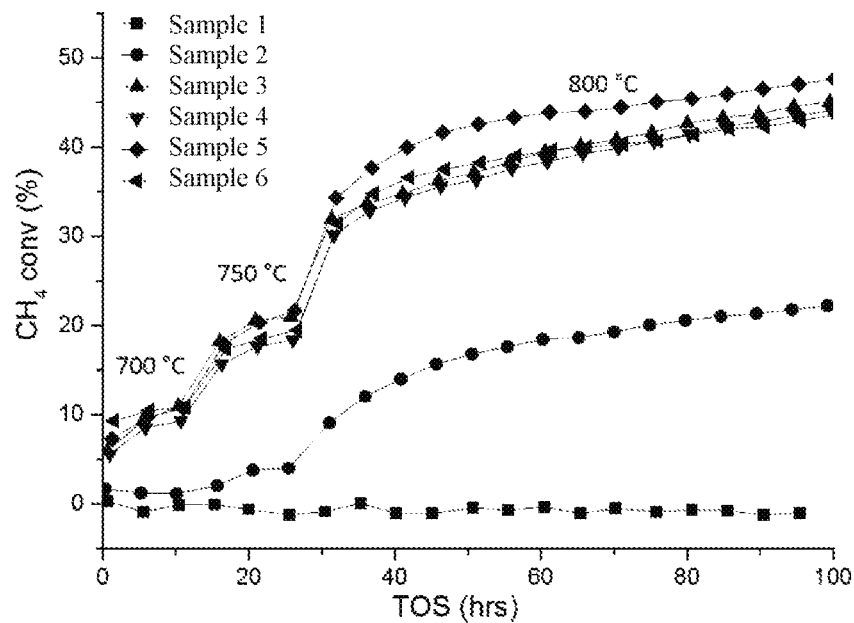
FIG. 6 are graphical depictions of % methane conversion versus time, in hours, for the various bulk metal oxide catalysts of the present invention and manganese silicon oxides.
Figure 7:
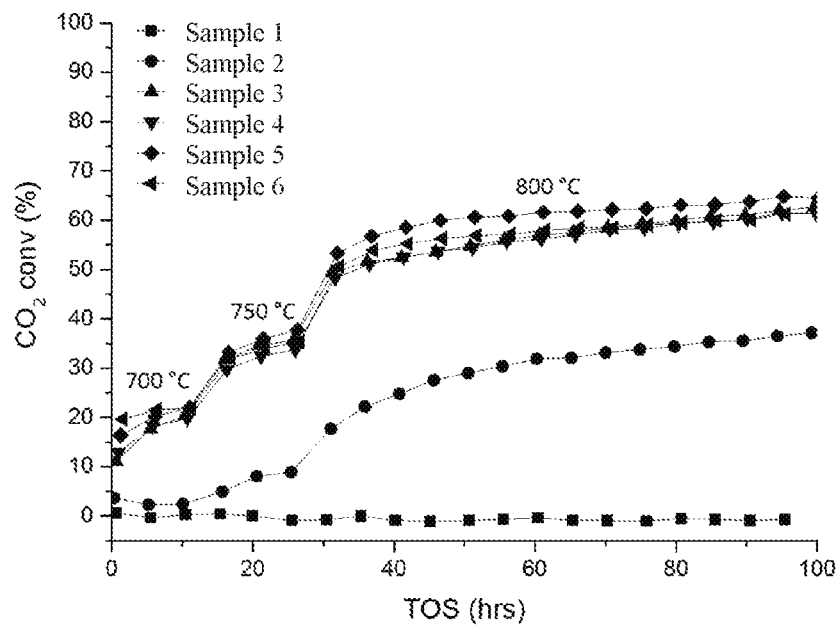
FIG. 7 are graphical depictions of carbon dioxide conversion versus, time in hours, for the various bulk metal oxide catalysts of the present invention and manganese silicon oxides.
Figure 8:
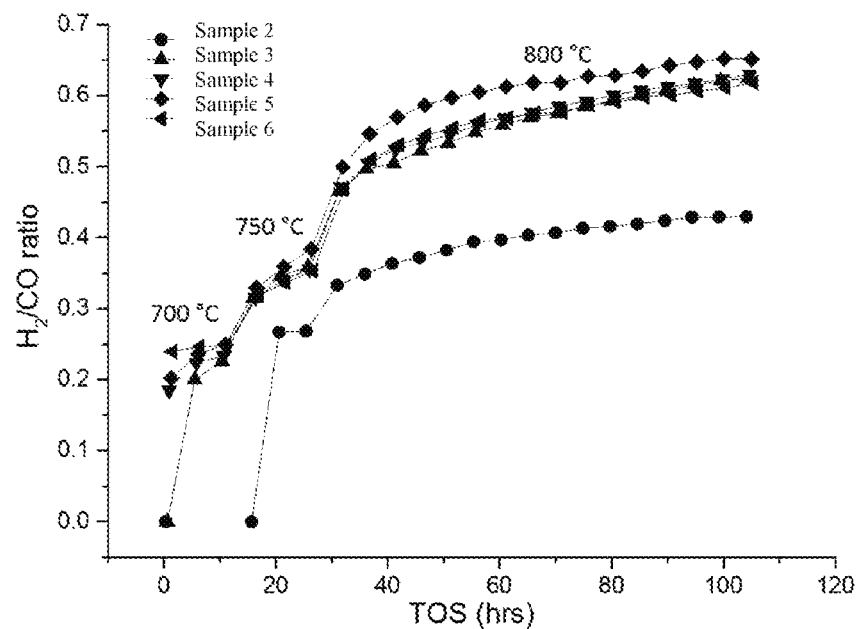
FIG. 8 are graphical depictions of ratio of hydrogen to carbon monoxide conversion versus time, in hours, for the various bulk metal oxide catalysts of the present invention and manganese silicon oxides.
Figure 9:
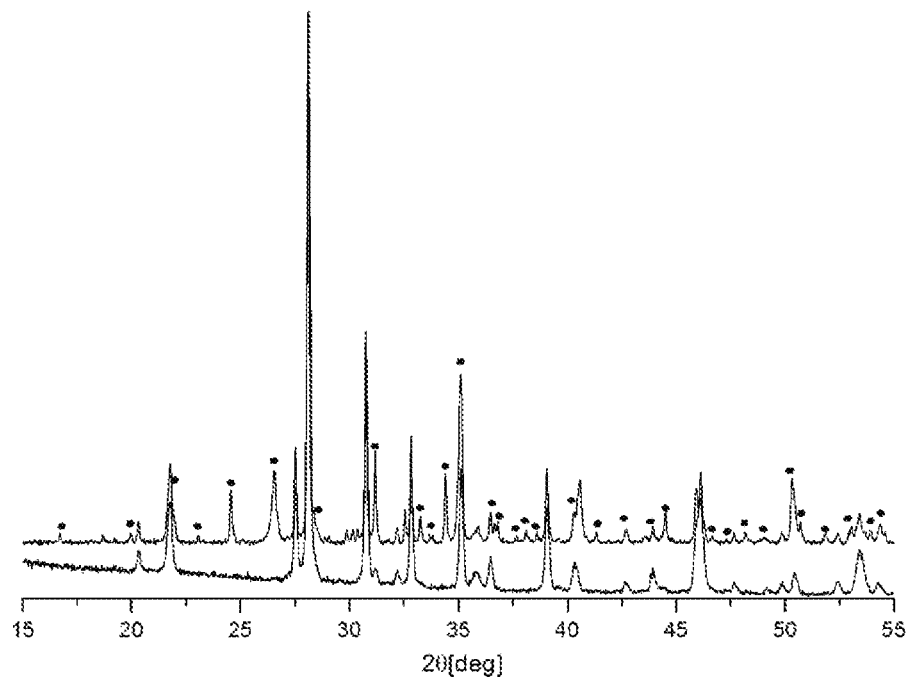
FIG. 9 are X-Ray Diffraction (XRD) patterns of a spent bulk metal oxide catalyst of the present invention and manganese silicon oxide.

CDRM using bulk NiMn catalysts of the present invention. The bulk NiMn catalysts of Table 1 and Table 4 were tested at 700° C. to 800° C. at 1 bara, and a gas hourly space velocity (GSHV) of 75,500 h$^{-1}$ for 100 hours of operation. The initial temperature was 700° C. and was increased to 750° C. after 15 hours, and then increased to 800° C. after about 30 hours. After 40 hours of operation, the percent conversion of methane was between 10% and 50%, the percent conversion of carbon dioxide was greater than 10% and 70%, and the $H_2$/CO ratio was between 0.35 and 0.60 for the catalysts. The catalyst that had a non-detectable olivine crystal phase had a percent conversion of methane of about 10%, a percent conversion of carbon dioxide of about 20%, and the $H_2$/CO ratio of about 0.35 after about 40 hours time on stream and 800° C. For catalysts that contained olivine crystal phases, the percent conversion of methane was greater than 30%, the percent conversion of carbon dioxide was greater than 40%, and the $H_2$/CO ratio was greater than 0.45 after 40 hours time on stream and 800° C. Table 4 lists the percent methane conversion for the catalysts of the present invention (samples 2-6) and inert manganese silicon oxides (sample 1) at 100 hours of run time. FIGS. 6-8 are graphical depictions of % methane (FIG. 6), % carbon dioxide conversion (FIG. 7), and the ratio of hydrogen to carbon monoxide versus time, in hours (FIG. 8) for the samples listed in Tables 1 and 2. In FIGS. 6-8, the data using the inactive sample 1 as the catalyst is represented by square blocks, the data for novel catalyst Sample #2 is represented by circles, the data for novel catalyst Sample #3 is represented by upright triangles, the data for novel catalyst Sample #4 is represented by upside down triangles, the data for novel catalyst Sample #5 is represented by turned squares, and the data for novel catalyst Sample #6 is represented by turned triangles. Further, the catalyst was found to be stable without any deactivation for 100 hours of duration as shown by the XRD pattern in FIG. 9. FIG. 9 shows XRD patterns of spent catalyst (top pattern, sample 3) of the present invention and inert material steatite a kind of mineral talc, magnesium silicate (bottom pattern). The circles on the peaks in the top pattern represent the peaks for both crystalline phases $Ni_xMn_{3-x}O_4$ and $(Ni_xMn_{1-x})_2SiO_4$. Since both crystalline phases were still present in the spent catalyst, the activity of the catalyst had not changed after 100 hours time on stream. No sintering was observed.

TABLE 4

| Sample No. | Material Name | $n_{Mn}/n_{Ni}$ (Molar Ratio) | Crystal Phases | $CH_4$ conversion (%) | TOS (hours) |
|---|---|---|---|---|---|
| 1 | $Mn_2Si$ | ∞ | $Mn_3O_4$ $MnSiO_3$ | 0 | 100 |
| 2 | $Mn_{1.9}Si$—$Ni_{0.1}$ | 19 | $MnSiO_3$ $Ni_xMn_{3-x}O_4$ | 20 | 100 |
| 3 | $Mn_{1.8}Si$—$Ni_{0.2}$ | 9 | $MnSiO_3$ $Ni_xMn_{3-x}O_4$ $(Ni_xMn_{1-x})_2SiO_4$ | 40 | 100 |
| 4 | $Mn_{1.7}Si$—$Ni_{0.3}$ | 5.7 | $MnSiO_3$ $Ni_xMn_{3-x}O_4$ $(Ni_xMn_{1-x})_2SiO_4$ | 40 | 100 |
| 5 | $Mn_{1.6}Si$—$Ni_{0.4}$ | 4 | $MnSiO_3$ $Ni_xMn_{3-x}O_4$ $(Ni_xMn_{1-x})_2SiO_4$ | 40 | 100 |
| 6 | $Mn_{1.5}Si$—$Ni_{0.5}$ | 3 | $MnSiO_3$ $Ni_xMn_{3-x}O_4$ $(Ni_xMn_{1-x})_2SiO_4$ | 40 | 100 |

CDRM using bulk MnSi catalysts of the present invention. The MnSi catalyst listed in Table 1 having $Mn_3O_4$ and MnSiO3 phases were tested at the same conditions the NiMn were tested. No methane conversion were observed for this catalyst after 100 hours (see FIGS. 6-8). Thus, the $Mn_3O_4$ and $MnSiO_3$ phases were considered inactive towards carbon dioxide reforming of methane.

Example 4

Dry Reforming of Methane with Olivine Bulk Metal Catalysts of the Present Invention Testing of the olivine bulk metal catalysts was performed using the general procedure described in Example 4, with exceptions described in the specific sections below.

Figure 10:
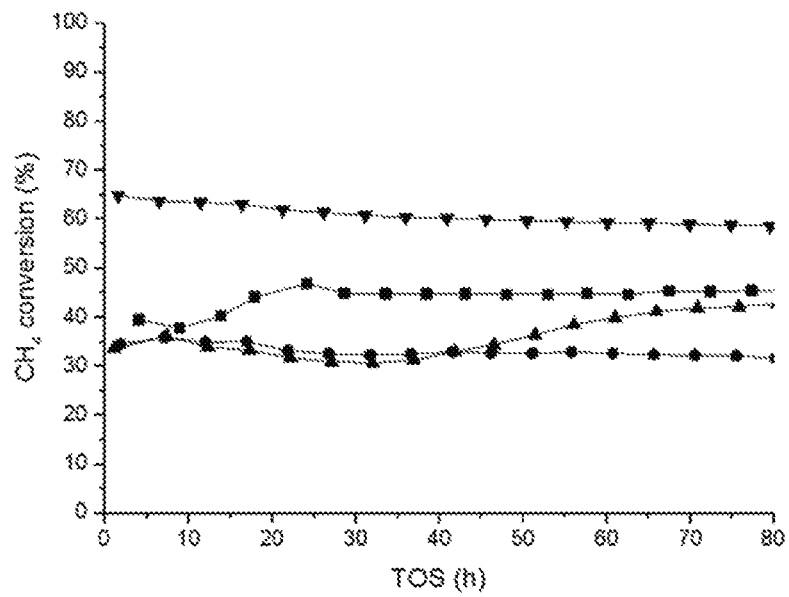
FIG. 10 graphical depictions of % methane conversion versus time, in hours, for the $(Ni_{0.15}Mn_{0.85})_2SiO_4$ (■), $(Ni_{0.2}Mn_{0.8})_2SiO_4$ (•), $(Ni_{0.25}Mn_{0.75})_2SiO_4$ (▲) catalysts the present invention and comparative pyrochlore catalyst (▼).
Figure 11:
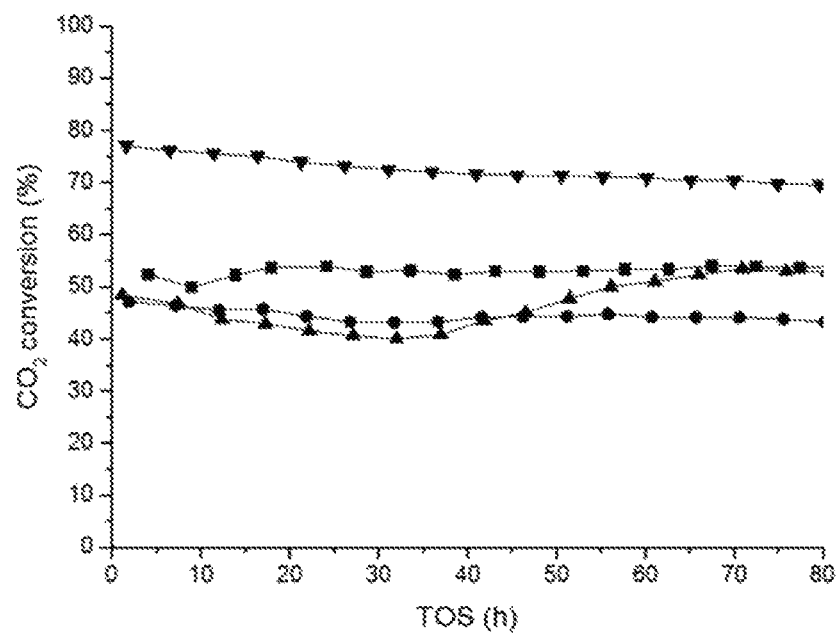
FIG. 11 are graphical depictions of carbon dioxide conversion versus, time in hours, for the $(Ni_{0.15}Mn_{0.85})_2SiO_4$ (■), $(Ni_{0.2}Mn_{0.8})_2SiO_4$ (•), $(Ni_{0.25}Mn_{0.75})_2SiO_4$ (▲) catalysts of the present invention and comparative pyrochlore catalyst (▼).
Figure 12:
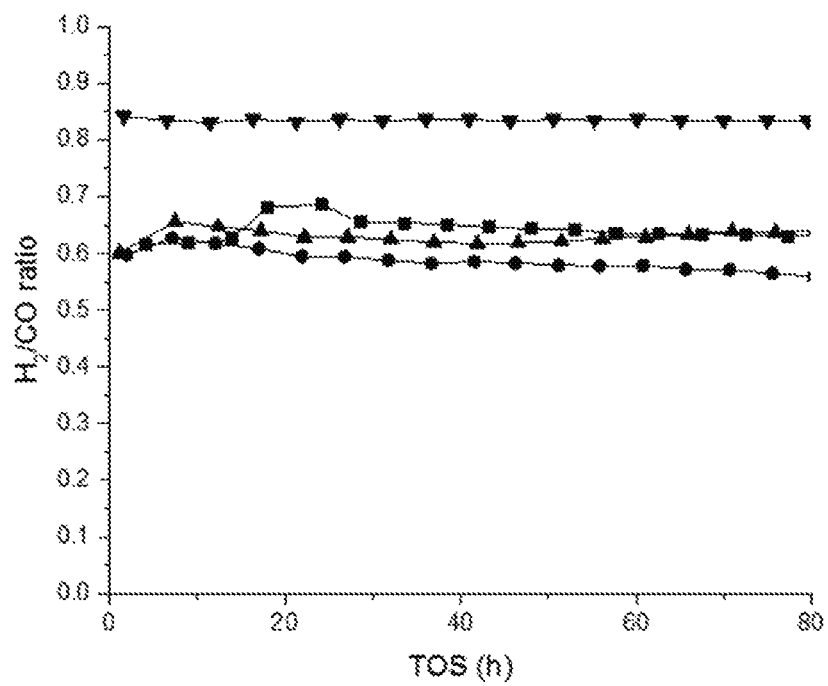
FIG. 12 are graphical depictions of ratio of hydrogen to carbon monoxide conversion versus time, in hours, for the $(Ni_{0.15}Mn_{0.85})_2SiO_4$ (■), $(Ni_{0.2}Mn_{0.8})_2SiO_4$ (●), $(Ni_{0.25}Mn_{0.75})_2SiO_4$ (▲) catalysts of the present invention and comparative pyrochlore catalyst (▼).

CDRM using bulk Ni—Mn olivine of the present invention at a pressure of 10 bar. CDRM reaction was carried out at T=800° C. and $P_{tot}$=10 bar. The space velocity was 60,000 h$^{-1}$ for a gas composition of 10% Ar/45% $CO_2$/45% $CH_4$, with 40 mg of catalyst. The feed rate used was 50 cc·min$^{-1}$. FIGS. 10 and 11 show the $CH_4$ conversion and $CO_2$ conversion respectively. The tested catalysts were $(Ni_{0.15}Mn_{0.85})_2SiO_4$, $(Ni_{0.2}Mn_{0.8})_2SiO_4$, $(Ni_{0.25}Mn_{0.75})_2SiO_4$ and comparative catalyst pyrochlore LRZ. FIG. 10: $CH_4$ conversion of $(Ni_{0.15}Mn_{0.85})_2SiO_4$ (■), $(Ni_{0.2}Mn_{0.8})_2SiO_4$ (•), $(Ni_{0.25}Mn_{0.75})_2SiO_4$ (▲) and comparative pyrochlore catalyst (▼). FIG. 11 $CO_2$ conversion of $(Ni_{0.15}Mn_{0.85})_2SiO_4$ (■), $(Ni_{0.2}Mn_{0.8})_2SiO_4$ (•), $(Ni_{0.25}Mn_{0.75})_2SiO_4$ (▲) and comparative pyrochlore catalyst (▼). Under these experimental conditions, the comparative pyrochlore catalyst exhibited the highest $CH_4$ conversion and $CO_2$ conversion with 60% and 70% respectively. However, the competitive pyrochlore catalyst deactivated after 200 h of run time. After 80 h, olivine catalysts of the present invention, with a Ni/Mn ratio of 0.17 and 0.33, exhibited the same $CH_4$ and $CO_2$ conversion, 45% and 55% respectively. The olivine catalysts of the present invention with Ni/Mn ratio=0.25 exhibited a $CH_4$ conversion of 35% and a $CO_2$ conversion of 45%. After 80 h of run, olivine catalysts of the present invention did not show any deactivation behavior. FIG. 12 shows graphs of $H_2$/CO ratio of $(Ni_{0.15}Mn_{0.85})_2SiO_4$ (■), $(Ni_{0.2}Mn_{0.8})_2SiO_4$ (•), $(Ni_{0.25}Mn_{0.75})_2SiO_4$ (▲) and comparative pyrochlore catalyst (▼). The $H_2$/CO of $(Ni_{0.15}Mn_{0.85})_2SiO_4$ and $(Ni_{0.25}Mn_{0.75})_2SiO_4$ are stable and equal to 0.6, however, the $H_2$/CO ratio of $(Ni_{0.2}Mn_{0.8})_2SiO_4$ is slightly lower than the other and decreases from 0.6 to 0.55 after 80 h. From these results is was determined that the different reactions involved in the CDRM, (dry reforming, RWGS and steam reforming) are not in a steady state and the active site of the catalyst is still evolving.

Figure 13:
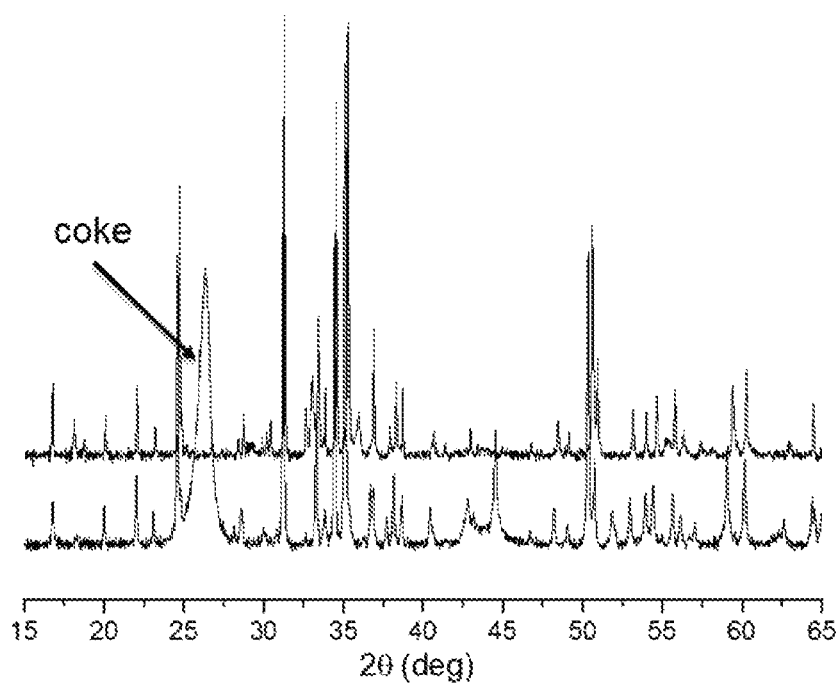
FIG. 13 shows the XRD patterns of the olivine $(Ni_{0.2}Mn_{0.8})_2SiO_4$ before (top) and after the CDRM reaction (bottom pattern).

FIG. 13 shows the XRD pattern of the olivine $(Ni_{0.2}Mn_{0.8})_2SiO_4$ before (top) and after the CDRM reaction (bottom pattern). Under these experimental reactions, no modification of the olivine structure was detected. Thus, Ni/Mn olivine of the present invention is a stable catalyst for the CDRM. It was noted that the spinel XRD pattern was not detected after the CDRM reaction, which was determined to result in a modification of the spinel phase during the experiment. Without wishing to be bound by theory, it is believed that the change in the spinel phase explains the modification of the reactivity of the catalyst over the time. The XRD pattern of the spent catalyst (after the CDRM reaction) shows a broad peak at $2\theta=26.3°$. This peak was attributed to the coke formation during the reaction and 30 wt % of coke was determined by using the Vegard's law.

CDRM using the M-Ni/Mn olivine of the present invention at a pressure of 5 bar. CDRM reaction is carried out at T=800° C. and $P_{tot}$=5 bar. The space velocity is 60,000 h$^{-1}$ for a gas composition of 10% Ar/45% $CO_2$/45% $CH_4$, with 40 mg of catalyst. The feed flow was 50 cc·min$^{-1}$.

Figure 14:
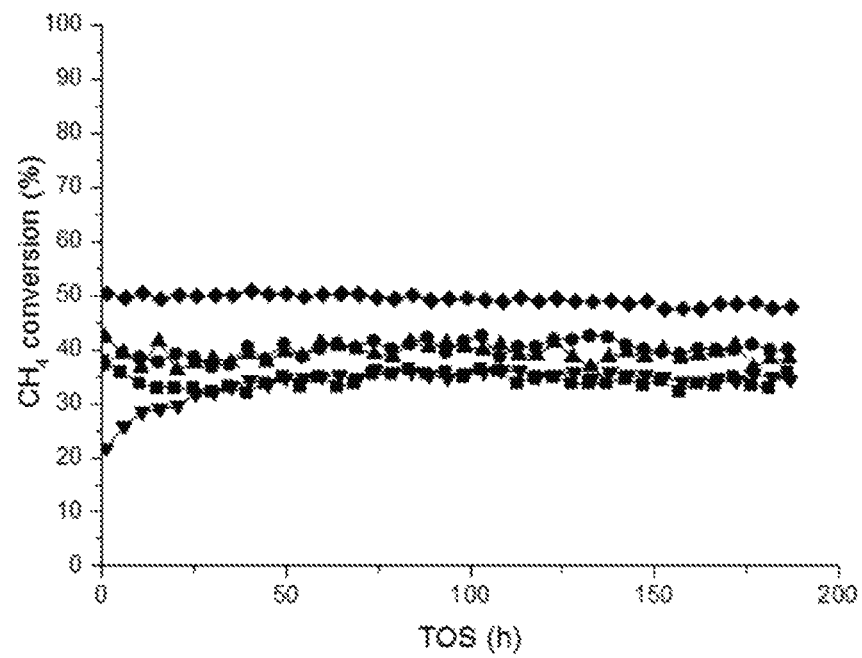
FIG. 14 are graphical depictions of % methane conversion versus time, in hours, for the $Ag_{0.02}(Ni_{0.28}Mn_{1.7})SiO_4$ (■), $Ru_{0.02}(Ni_{0.28}Mn_{1.7})SiO_4$ (•), $Ir_{0.02}(Ni_{0.28}Mn_{1.7})SiO_4$ (▲), $Pt_{0.02}(Ni_{0.28}Mn_{1.7})SiO_4$ (▼) and $Rh_{0.02}(Ni_{0.28}Mn_{1.7})SiO_4$ (♦) catalysts of the present invention.
Figure 15:
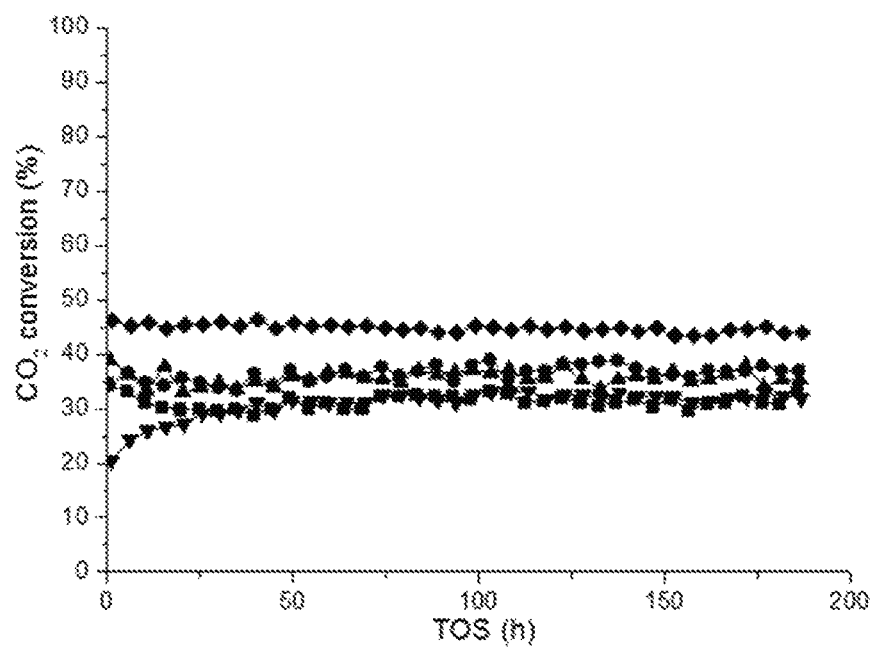
FIG. 15 are graphical depictions of % methane conversion versus time, in hours, for the $Ag_{0.02}(Ni_{0.28}Mn_{1.7})SiO_4$ (■), $Ru_{0.02}(Ni_{0.28}Mn_{1.7})SiO_4$ (•), $Ir_{0.02}(Ni_{0.28}Mh_{1.7})SiO_4$ (▲), $Pt_{0.02}(Ni_{0.28}Mn_{1.7})SiO_4$ (▼) and $Rh_{0.02}(Ni_{0.28}Mn_{1.7})SiO_4$ (♦) catalysts of the present invention.
Figure 16:
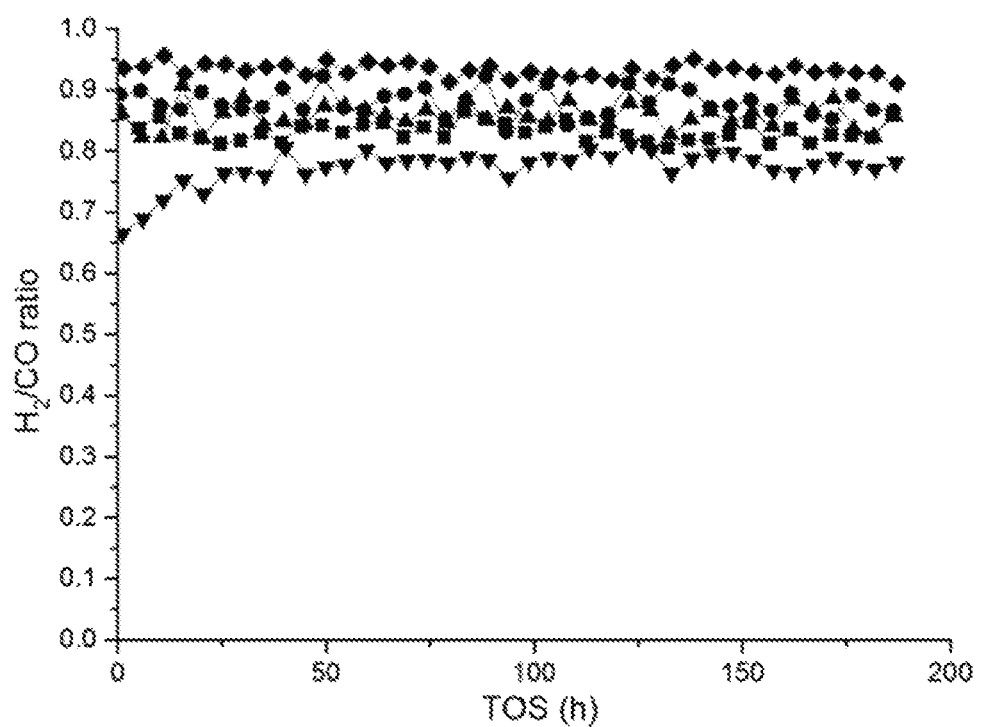
FIG. 16 are graphical depictions of ratio of hydrogen to carbon monoxide conversion versus time, in hours, $Ag_{0.02}(Ni_{0.28}Mn_{1.7})SiO_4$ (■), $Ru_{0.02}(Ni_{0.28}Mn_{1.7})SiO_4$ (•), $Ir_{0.02}(Ni_{0.28}Mn_{1.7})SiO_4$ (▲), $Pt_{0.02}(Ni_{0.28}Mn_{1.7})SiO_4$ (▼) and $Rh_{0.02}(Ni_{0.28}Mn_{1.7})SiO_4$ (♦) catalysts of the present invention.

FIGS. 14 and 15 show the $CH_4$ conversion and $CO_2$ conversion respectively of Ag—Ni/Mn olivine, Ru—Ni/Mn olivine, Ir—Ni/Mn olivine, Pt—Ni/Mn olivine, and Rh—Ni/Mn olivine. FIG. 14: $CH_4$ conversion of $Ag_{0.02}(Ni_{0.28}Mn_{1.7})SiO_4$ (■), $Ru_{0.02}(Ni_{0.28}Mn_{1.7})SiO_4$ (•), $Ir_{0.02}(Ni_{0.28}Mn_{1.7})SiO_4$ (▲), $Pt_{0.02}(Ni_{0.28}Mn_{1.7})SiO_4$ (▼) and $Rh_{0.02}(Ni_{0.28}Mn_{1.7})SiO_4$ (♦). FIG. 15 $CO_2$ conversion of $Ag_{0.02}(Ni_{0.28}Mn_{1.7})SiO_4$ (■), $Ru_{0.02}(Ni_{0.28}Mn_{1.7})SiO_4$ (•), $Ir_{0.02}(Ni_{0.28}Mn_{1.7})SiO_4$ (▲), $Pt_{0.02}(Ni_{0.28}Mn_{1.7})SiO_4$ (▼) and $Rh_{0.02}(Ni_{0.28}Mm_{1.7})SiO_4$ (♦). After few hours of run, the Pd—Ni/Mn olivine deactivated because of the coke formation. Consequently, the catalyst results were not shown on these figures. The others olivine catalyst of the present invention show a very good stability and after 180 h of run no trend of deactivation was detected. The $CH_4$ conversion of the Ag—Ni/Mn, Ru—Ni/Mn, Ir—Ni/Mn and Pt—Ni/Mn based olivine catalysts of the present invention were around 35-40% while Rh—Ni/Mn shows a conversion of 50%. FIG. 16 shows the $H_2$/CO ratio of Ag—Ni/Mn olivine, Ru—Ni/Mn olivine, Ir—Ni/Mn olivine, Pt—Ni/Mn olivine, and Rh—Ni/Mn olivine. FIG. 16: $H_2$/CO ratio of $Ag_{0.02}(Ni_{0.28}Mn_{1.7}SiO_4$ (■), $Ru_{0.02}(Ni_{0.28}Mn_{1.7})SiO_4$ (•), $Ir_{0.02}(Ni_{0.28}Mn_{1.7})SiO_4$ (▲), $Pt_{0.02}(Ni_{0.28}Mn_{1.7})SiO_4$ (▼) and $Rh_{0.02}(Ni_{0.28}Mn_{1.7})SiO_4$ (♦). All of these catalysts were stable over 180 h. The lowest ratio was around 0.75 while the Rh—Ni/Mn was 0.95. By comparing this result with the $H_2$/CO ratio obtained without noble metal doping, it was determined that the $H_2$/CO ratio were increased by 10 to 15%. This improvement was attributed to the noble metal doping.

The invention claimed is:

1. A bulk metal oxide catalyst capable of producing hydrogen ($H_2$) and carbon monoxide (CO) from methane ($CH_4$) and carbon dioxide ($CO_2$), wherein the bulk metal oxide catalyst consists of an olivine crystal structure that has discrete $SiO_4^{4-}$ anions and two metals ($M^1$, $M^2$) in the crystal lattice, a discrete spinel structure, or is a mixture thereof,
wherein $M^1$ and $M^2$ are different;
wherein the $O^-$ anions of the silicate are coordinated with the metals in the crystal lattice, and
wherein the bulk metal oxide catalyst does not include a carrier or a support.

2. The bulk metal oxide of claim 1, wherein $M^1$ comprises nickel (Ni) or a compound thereof, and $M^2$ comprises manganese (Mn) or a compound thereof.

3. The bulk metal oxide catalyst of claim 2, wherein the olivine crystal phase comprises a nickel-manganese olivine crystal phase having a structure of $(Ni_xMn_{1-x})_2SiO_4$, where x is $0<x\leq0.25$ and wherein the catalyst further comprises a spinel crystal phase.

4. The bulk metal oxide catalyst of claim 3, further comprising a metal oxide crystal phase having a structure of $MnSiO_3$.

5. The bulk metal oxide catalyst of claim 3, wherein the spinel crystal phase comprises a nickel-manganese spinel crystal phase having a structure of $(Ni_xMn_{3-x})O_4$, where x is $0<x\leq1$.

6. The bulk metal oxide catalyst of claim 5, further comprising a metal oxide crystal phase having a structure of $MnSiO_3$.

7. The bulk metal oxide catalyst of claim 1, wherein the olivine crystal phase is represented by the formula of: $(M^1_xM^2_{1-x})_2SiO_4$, where x is $0<x\leq0.25$, wherein $M^1$ and $M^2$ are different.

8. The bulk metal oxide catalyst of claim 1, wherein the catalyst consists of the olivine crystal structure.

9. The bulk metal oxide catalyst of claim 1, wherein the catalyst consists of the spinel structure.

10. The bulk metal oxide catalyst of claim 1, wherein the catalyst consists of a combination of the olivine crystal structure and the spinel structure.

11. A reactant composition comprising the bulk metal oxide catalyst of claim 1, and one or both of $CH_4$ and $CO_2$.

12. A method of producing $H_2$ and CO comprising contacting a reactant gas stream that includes $CH_4$ and $CO_2$ with a bulk metal oxide catalyst catalysts of claim 1 under substantially dry reaction conditions and at a temperature of greater than 800° C. sufficient to produce a product gas stream comprising $H_2$ and CO; wherein the bulk metal oxide catalyst consists of an olivine crystal structure that has discrete $SiO_4^{4-}$ anions and two metals ($M^1$, $M^2$) in the crystal lattice, or a discrete spinel structure, or is a mixture thereof,
wherein $M^1$ and $M^2$ are different;
wherein the $O^-$ anions of the silicate are coordinated with the metals in the crystal lattice, and
wherein the bulk metal oxide catalyst does not include a carrier or a support.

13. The method of claim 12, wherein a ratio of CO to $H_2$ ranges from 0.35:1 to 1:1 after 40 hours.

14. The method of claim 12, wherein coke formation on the bulk metal oxide catalyst is substantially or completely inhibited.

15. A method of making the bulk metal oxide of claim 1, the method comprising:
(a) obtaining a mixture comprising $M^1$ oxide particles, silicon dioxide particles, and $M^2$ oxide particles, and wherein the molar ratio of $M^2$:Si is 1:1 to 3:1, and the molar ratio of $M^1$:$M^2$ is 0.01 to 0.5; and
(b) calcining the mixture at a temperature of 1000° C. to 1500° C., for a sufficient period of time to obtain a bulk catalyst having a $M^1$-$M^2$ olivine crystal phase, a spinel phase, or a combination thereof.

16. The method of claim 15, wherein the calcining is conducted at a temperature of about 1100° C. to 1275° C. for about 22 to 48 hours and subsequently cooled to room temperature.

17. A catalyst comprising:
- a support comprising an olivine mineral having an olivine crystal phase, wherein the olivine mineral is selected from the group consisting of monticelite, calcio-olivine, lienbergite, glaucochroite, and any combination thereof; and
- two or more additional metals ($M^1$, $M^2$) or two or more compounds thereof.

* * * * *

UNITED STATES PATENT AND TRADEMARK OFFICE
CERTIFICATE OF CORRECTION

PATENT NO. : 10,369,549 B2
APPLICATION NO. : 15/557156
DATED : August 6, 2019
INVENTOR(S) : Ugo Ravon et al.

It is certified that error appears in the above-identified patent and that said Letters Patent is hereby corrected as shown below:

On the Title Page

In Item [57] Abstract, Line 2 should read:
"their use, that include at least two or more metals or two".

In the Claims

In Claim 12 on Column 20, Line 36, remove "catalysts".

In Claim 15 on Column 20, Line 62, "M'" should read -- $M^1$ --.

Signed and Sealed this
Fourteenth Day of January, 2020

Andrei Iancu
*Director of the United States Patent and Trademark Office*